United States Patent
Zaki et al.

(10) Patent No.: US 12,160,389 B2
(45) Date of Patent: Dec. 3, 2024

(54) SCHEDULING FOR IMPROVED THROUGHPUT IN ENHANCED MACHINE-TYPE COMMUNICATION

(71) Applicant: Qualcomm Incorporated, San Diego, CA (US)

(72) Inventors: Ahmed Zaki, Bengaluru (IN); Vijayvaradharaj Tirucherai Muralidharan, Santa Clara, CA (US); Alberto Rico Alvarino, San Diego, CA (US); Le Liu, San Jose, CA (US); Murali Menon, Acton, MA (US); Chao Wei, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 388 days.

(21) Appl. No.: 17/613,922

(22) PCT Filed: May 22, 2020

(86) PCT No.: PCT/CN2020/091745
§ 371 (c)(1),
(2) Date: Nov. 23, 2021

(87) PCT Pub. No.: WO2020/238786
PCT Pub. Date: Dec. 3, 2020

(65) Prior Publication Data
US 2022/0231820 A1    Jul. 21, 2022

(30) Foreign Application Priority Data
May 24, 2019   (WO) ................ PCT/CN2019/088328

(51) Int. Cl.
*H04L 5/00*     (2006.01)
*H04L 1/1822*   (2023.01)
(Continued)

(52) U.S. Cl.
CPC .......... *H04L 5/0055* (2013.01); *H04L 1/1822* (2013.01); *H04L 1/1854* (2013.01);
(Continued)

(58) Field of Classification Search
CPC ... H04L 5/0055; H04L 1/1822; H04L 1/1854; H04W 72/23; H04W 72/1273; H04W 5/0044
See application file for complete search history.

(56) References Cited

U.S. PATENT DOCUMENTS

| | | | |
|---|---|---|---|
| 10,171,226 B2 | 1/2019 | Toledano et al. | |
| 10,314,037 B2 | 6/2019 | Chen et al. | |

(Continued)

FOREIGN PATENT DOCUMENTS

| | | | |
|---|---|---|---|
| CN | 101568152 A | 10/2009 | |
| CN | 103384193 A | 11/2013 | |

(Continued)

OTHER PUBLICATIONS

"ACK/NACK bundling in FeMTC" Lisbon, Portugal. Oct. 14, 2016 (Year: 2016).*

(Continued)

*Primary Examiner* — Mewale A Ambaye
(74) *Attorney, Agent, or Firm* — Holland & Hart LLP

(57) ABSTRACT

Methods, systems, and devices for wireless communications are described. A frame, scheduling instance, scheduling period etc. may include a set of downlink subframes and a set of uplink subframes. At least one control message transmitted in a downlink subframe may schedule a set of data messages in the downlink subframes of the frame. The downlink subframe may also include data messages scheduled by a control message of a previous frame. Further, feedback timings for data messages of the frame may be determined based on the corresponding control messages (Continued)

(e.g., from the current frame and the previous frame). Feedback responses corresponding to the data messages may be transmitted in a bundled manner in the set of uplink subframes. Using this cross-frame scheduling technique, the resources of a frame may be efficiently utilized.

30 Claims, 18 Drawing Sheets

(51) Int. Cl.
  *H04L 1/1829* (2023.01)
  *H04W 72/1273* (2023.01)
  *H04W 72/23* (2023.01)

(52) U.S. Cl.
  CPC ....... *H04L 5/0044* (2013.01); *H04W 72/1273* (2013.01); *H04W 72/23* (2023.01)

(56) References Cited

U.S. PATENT DOCUMENTS

| | | | |
|---|---|---|---|
| 10,341,061 | B2 | 7/2019 | Chen et al. |
| 10,447,459 | B2 | 10/2019 | Fakoorian et al. |
| 2014/0029559 | A1 | 1/2014 | Seo et al. |
| 2016/0269260 | A1 | 9/2016 | Kazmi et al. |
| 2016/0316482 | A1 | 10/2016 | Garcia et al. |
| 2017/0163388 | A1 | 6/2017 | Wiemann et al. |
| 2018/0160425 | A1 | 6/2018 | Wiberg et al. |
| 2019/0103947 | A1 | 4/2019 | Park |
| 2019/0254013 | A1* | 8/2019 | Chang ........................ H04L 5/00 |
| 2019/0313386 | A1* | 10/2019 | Hwang ............... H04W 74/006 |
| 2019/0342037 | A1* | 11/2019 | Karaki .................. H04L 1/1854 |
| 2020/0178226 | A1* | 6/2020 | Papasakellariou .... H04L 1/1861 |
| 2022/0240223 | A1* | 7/2022 | Bai ........................ H04L 5/0055 |
| 2023/0140147 | A1* | 5/2023 | Park ...................... H04L 5/0082 370/329 |

FOREIGN PATENT DOCUMENTS

| | | |
|---|---|---|
| CN | 103782639 A | 5/2014 |
| CN | 103906251 A | 7/2014 |
| CN | 105122932 A | 12/2015 |
| CN | 107872302 A | 4/2018 |
| CN | 108604946 A | 9/2018 |
| WO | WO-2012131443 A1 | 10/2012 |
| WO | WO-2016144244 A1 | 9/2016 |
| WO | WO-2017155594 A1 | 9/2017 |
| WO | WO-2017172208 A1 | 10/2017 |
| WO | WO-2018009595 | 1/2018 |
| WO | WO-2019051418 A1 | 3/2019 |

OTHER PUBLICATIONS

"Enhancements to Scheduling and HARQ operation for NR-U" Taipei, Taiwan. Jan. 21-25, 2019 (Year: 2019).*
"Detailed design of HARQ-ACK bundling in HD-FDD" Reno, USA. Nov. 14-18, 2016 (Year: 2016).*
International Search Report and Written Opinion—PCT/CN2019/088328—ISA/EPO—Feb. 24, 2020 (192453WO1).
International Search Report and Written Opinion—PCT/CN2020/091745—ISAEPO—Jul. 29, 2020 (192453WO2).
Nokia, et al., "ACK/NACK Bundling in FeMTC", R1-1608892, 3GPP TSG-RAN WG1 Meeting #86bis, Sep. 30, 2016 (Sep. 30, 2016), 4 Pages.
Qualcomm Incorporated: "Enhancements to Scheduling and HARQ operation for NR-U", R1-1900875, 3GPP TSG RAN WG 1 Meeting #AH 1901, Enhancements to Scheduling and HARQ Operation for NR-U, 3rd Generation Partnership Project (3GPP), Mobile Competence Centre; 650, Route Des Lucioles; F-06921 Sophia-Antipolis vol. RAN WG1, No. Taipei, Taiwan; Jan. 21, 2019-Jan. 25, 2019, Jan. 20, 2019 (Jan. 20, 2019), XP051593721,Jan. 12, 2019 (Jan. 12, 2019), 11 Pages, Retrieved from the Internet: URL: http://www.3gpp.org/ftp/Meetings%5F3GPP%5FSYNC/RAN1/Docs/R1%2D1900875%2Ezip. [retrieved on Jan. 20, 2019], p. 7-p. 8.
ZTE: "Detailed Design of HARQ-ACK Bundling in HD-FDD", R1-1612595, 3GPP TSG RAN WG1 Meeting #86bis, Nov. 4, 2016 (Apr. 11, 2016), 5 Pages.
Taiwan Search Report—TW109117088—TIPO—Aug. 31, 2023 (192453TW).
Huawei et al., "Scheduling Multiple DL/UL Transport Blocks for SC-PTM and Unicast", 3GPP TSG RAN WG1 Meeting #96, R1-1901504, 3rd Generation Partnership Project (3GPP), Mobile Competence Centre, 650, Route Des Lucioles, F-06921 Sophia-Antipolis Cedex, France vol. RAN WG1, No. Athens, Greece, Feb. 25, 2019-Mar. 3, 2019, 12 Pages, Feb. 16, 2019, XP051599201, figure 5.
Qualcomm Incorporated: "Enhancements to Scheduling and HARQ Operation for NR-U", 3GPP TSG RAN WG1 Meeting #97, R1-1907263, 7.2.2.2.3, 3rd Generation Partnership Project, Mobile Competence Centre, 650, Route Des Lucioles, F-06921, Sophia-Antipolis Cedex, France, vol. RAN WG1, No. Reno, US, May 13, 2019-May 17, 2019, May 13, 2019, XP051728703, 12 pages.
Sierra Wireless: "HARQ and Cross SF scheduling for HD-FDD UEs in Normal Coverage", 3GPP TSG RAN WG1 Meeting #82, R1-154487_M-PDCCH_HDFDD_NMB, 3rd Generation Partnership Project (3GPP), Mobile Competence Centre, 650, Route Des Lucioles, F-06921 Sophia-Antipolis Cedex, France, vol. RAN WG1, No. Beijing, China, Aug. 24, 2015-Aug. 28, 2015, 5 Pages, Aug. 23, 2015, XP051039498, paragraph [04.4], p. 1.
Supplementary European Search Report—EP20812550—Search Authority—The Hague—May 2, 2023 (192453EP).
Nokia, et al., "HARQ-ACK Bundling and Scheduling for FeMTC", 3GPP TSG-RAN WG1 Meeting #88, R1-1701855, Athens, Greece Feb. 13-17, 2017, 5 Pages.

* cited by examiner

| HARQ_ACK delay field 405 | Actual HARQ ID 410 | Scheduling Delay 415 |
|---|---|---|
| 000 | 10 | N+2 |
| 001 | 10 | N+7 |
| 010 | 11 | N+2 |
| 011 | 11 | N+7 |
| 100 | 12 | N+2 |
| 101 | 12 | N+7 |
| 110 | 13 | N+2 |
| 111 | 13 | N+7 |

— 400

| HARQ_ID field 420 | ACK Delay 425 |
|---|---|
| 10 | 4 |
| 11 | 5 |
| 12 | 7 |
| 13 | 9 |
| 14 | 11 |
| 15 | 13 |

— 430

| HARQ_ACK delay field 505 | Enhanced Scheduling 510 | HARQ_ACK Delay Value 515 | Scheduling Delay 520 |
|---|---|---|---|
| 000 | 0 | 4 | N+2 |
| 001 | 0 | 5 | N+7 |
| 010 | 0 | 6 | N+2 |
| 011 | 0 | 7 | N+7 |
| 100 | 0 | 8 | N+2 |
| 101 | 0 | 9 | N+7 |
| 110 | 0 | 11 | N+2 |
| 111 | 0 | 13 | N+7 |
| 000 | 1 | 12 | N+2 |
| 001 | 1 | 13 | N+7 |
| 010 | 1 | 12 | N+2 |
| 011 | 1 | 13 | N+7 |
| 100 | 1 | 8 | N+2 |
| 101 | 1 | 9 | N+7 |
| 110 | 1 |  | N+2 |
| 111 | 1 |  | N+7 |

500

US 12,160,389 B2

SCHEDULING FOR IMPROVED THROUGHPUT IN ENHANCED MACHINE-TYPE COMMUNICATION

CROSS-REFERENCE TO RELATED APPLICATIONS

The present Application is a 371 national stage filing of International PCT Application No. PCT/CN2020/091745 by ZAKI et al., entitled "SCHEDULING FOR IMPROVED THROUGHPUT IN ENHANCED MACHINE-TYPE COMMUNICATION," filed May 22, 2020; and claims priority to PCT Application No. PCT/CN2019/088328 by ZAKI et al., entitled "SCHEDULING FOR IMPROVED THROUGHPUT IN ENHANCED MACHINE-TYPE COMMUNICATION," filed May 24, 2019, each of which is assigned to the assignee hereof, and each of which is expressly incorporated by reference in its entirety herein.

TECHNICAL FIELD

The following relates generally to wireless communications, and more specifically to scheduling for feedback response.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Wireless communications systems may schedule communication resources according to a frame. Some subframes of a frame may be allocated for downlink communications, while other subframes of the frame may be allocated for uplink communications. In some cases, data messages may be scheduled in one or more downlink frames by a downlink control channel in the frame. Feedback responses (e.g., acknowledgements (ACKs) and negative-acknowledgement (NAKs)) for data messages in the frame may be allocated to the uplink subframes in the frame. Due to scheduling limitations, some downlink subframes in a frame may not include downlink data messages. Accordingly, some potential resources are wasted or not utilized for communications, which may result in communication inefficiencies.

SUMMARY

The described techniques relate to improved methods, systems, devices, and apparatuses that support scheduling for feedback response. Generally, the described techniques provide for receipt of at least one control message within a set of downlink subframes in a current scheduling instance (e.g., frame) and receipt of a plurality of data messages within the set of downlink subframes in the current scheduling instance. In some cases, some of the data messages are scheduled by the control message, while other data messages of the scheduling instance are scheduled by one or more control messages of a previous scheduling instance. Feedback timings for the data messages may be determined based on the control messages, and one or more feedback responses may be transmitted during uplink subframes of the current scheduling instance.

Various scheduling techniques may be implemented to support the described scheduling. In some cases, a delayed scheduling technique may be used by a control message to schedule a data message in a next scheduling instance (e.g., after one or more bundled feedback responses in the current scheduling instance). Additionally, modifications of feedback timing indications may be used to support the addition of data messages in a scheduling instance. The techniques may also include alternating feedback processes between adjacent scheduling instances, where feedback processes associated with control messages in the current scheduling instance and control messages in the previous scheduling instance may be processed concurrently. In some cases, downlink control information (DCI) may be used to indicate the feedback process, feedback timing, and scheduling for one or more data messages in a scheduling instance.

A method of wireless communications at a UE is described. The method may include receiving at least one control message within a set of downlink subframes in a current scheduling instance, receiving a set of data messages within the set of downlink subframes in the current scheduling instance, where a first subset of the set of data messages is received in accordance with the at least one control message in the current scheduling instance, and where a second subset of the set of data messages is received in accordance with one or more control messages received in a previous scheduling instance, determining a feedback timing for each of the set of data messages, where the feedback timing for the first subset of the set of data messages is based on the at least one control message, and where the feedback timing for the second subset of the set of data messages is based on the one or more control messages received in the previous scheduling instance, and transmitting one or more bundled feedback responses during uplink subframes in the current scheduling instance and in accordance with the feedback timing for each of the set of data messages.

An apparatus for wireless communications at a UE is described. The apparatus may include a processor, memory coupled with the processor, and instructions stored in the memory. The instructions may be executable by the processor to cause the apparatus to receive at least one control message within a set of downlink subframes in a current scheduling instance, receive a set of data messages within the set of downlink subframes in the current scheduling instance, where a first subset of the set of data messages is received in accordance with the at least one control message in the current scheduling instance, and where a second subset of the set of data messages is received in accordance with one or more control messages received in a previous scheduling instance, determine a feedback timing for each of the set of data messages, where the feedback timing for the first subset of the set of data messages is based on the at least one control message, and where the feedback timing for the second subset of the set of data messages is based on the one or more control messages received in the previous scheduling instance, and transmit one or more bundled feedback responses during uplink subframes in the current scheduling instance and in accordance with the feedback timing for each of the set of data messages.

Another apparatus for wireless communications at a UE is described. The apparatus may include means for receiving at least one control message within a set of downlink subframes in a current scheduling instance, receiving a set of data messages within the set of downlink subframes in the current scheduling instance, where a first subset of the set of data messages is received in accordance with the at least one control message in the current scheduling instance, and where a second subset of the set of data messages is received in accordance with one or more control messages received in a previous scheduling instance, determining a feedback timing for each of the set of data messages, where the feedback timing for the first subset of the set of data messages is based on the at least one control message, and where the feedback timing for the second subset of the set of data messages is based on the one or more control messages received in the previous scheduling instance, and transmitting one or more bundled feedback responses during uplink subframes in the current scheduling instance and in accordance with the feedback timing for each of the set of data messages.

A non-transitory computer-readable medium storing code for wireless communications at a UE is described. The code may include instructions executable by a processor to receive at least one control message within a set of downlink subframes in a current scheduling instance, receive a set of data messages within the set of downlink subframes in the current scheduling instance, where a first subset of the set of data messages is received in accordance with the at least one control message in the current scheduling instance, and where a second subset of the set of data messages is received in accordance with one or more control messages received in a previous scheduling instance, determine a feedback timing for each of the set of data messages, where the feedback timing for the first subset of the set of data messages is based on the at least one control message, and where the feedback timing for the second subset of the set of data messages is based on the one or more control messages received in the previous scheduling instance, and transmit one or more bundled feedback responses during uplink subframes in the current scheduling instance and in accordance with the feedback timing for each of the set of data messages.

In some examples of the method, apparatuses, and non-transitory computer-readable medium described herein, receiving the set of data messages may include operations, features, means, or instructions for receiving the second subset of the set of data messages after a downlink shared channel scheduling delay that includes subframes for transmission of one or more additional bundled feedback responses during the previous scheduling instance.

In some examples of the method, apparatuses, and non-transitory computer-readable medium described herein, receiving the at least one control message may include operations, features, means, or instructions for receiving the at least one control message scheduling one or more additional data messages after a downlink shared channel scheduling delay that results in the one or more additional data messages being scheduled in a next scheduling instance after transmission of the one or more bundled feedback responses during uplink subframes in the current scheduling instance.

Some examples of the method, apparatuses, and non-transitory computer-readable medium described herein may further include operations, features, means, or instructions for processing concurrent HARQ processes associated with the at least one control message received within the set of downlink subframes of the current scheduling instance and with the one or more control messages received in the previous scheduling instance.

Some examples of the method, apparatuses, and non-transitory computer-readable medium described herein may further include operations, features, means, or instructions for identifying a HARQ identifier (ID) field in a first control message of the at least one control message, and comparing a value of the HARQ ID field included in the first control message with a HARQ ID field threshold.

Some examples of the method, apparatuses, and non-transitory computer-readable medium described herein may further include operations, features, means, or instructions for determining that the value of the HARQ ID field in the first control message may be greater than the HARQ ID field threshold, and determining a downlink shared channel scheduling delay associated with the first control message based on a HARQ ACK delay field in the first control message.

Some examples of the method, apparatuses, and non-transitory computer-readable medium described herein may further include operations, features, means, or instructions for determining that the value of the HARQ ID field in the first control message may be greater than the HARQ ID field threshold, and determining a HARQ process ID associated with the first control message based on a HARQ ACK delay field in the first control message.

Some examples of the method, apparatuses, and non-transitory computer-readable medium described herein may further include operations, features, means, or instructions for determining that the value of the HARQ ID field in the first control message may be greater than the HARQ ID field threshold, and determining a feedback delay associated with the first control message based on the HARQ ID field.

Some examples of the method, apparatuses, and non-transitory computer-readable medium described herein may further include operations, features, means, or instructions for determining, based on the value of the HARQ ID field being less than or equal to the HARQ ID field threshold, a downlink shared channel scheduling delay associated with the first control message, a HARQ process ID associated with the first control message, and a feedback delay associated with the first control message, where the downlink shared channel scheduling delay may be a smaller of two available downlink shared channel scheduling delay values, the HARQ process ID may be equal to the value of the HARQ ID field, and the feedback delay may be indicated by a HARQ ACK delay field in the first control message.

In some examples of the method, apparatuses, and non-transitory computer-readable medium described herein, the two available downlink channel scheduling delay values include two downlink subframes and seven downlink subframes, where the determined downlink shared channel scheduling delay may be two downlink subframes based on the value of the HARQ ID field being less than or equal to the HARQ ID field threshold.

Some examples of the method, apparatuses, and non-transitory computer-readable medium described herein may further include operations, features, means, or instructions for identifying an enhanced scheduling field in a first control message of the at least one control message, and determining, based on a value of the enhanced scheduling field, a downlink shared channel scheduling delay associated with the first control message, a HARQ process identifier (ID) associated with the first control message, and a feedback delay associated with the first control message.

Some examples of the method, apparatuses, and non-transitory computer-readable medium described herein may further include operations, features, means, or instructions for identifying a HARQ process identifier (ID) associated with each of the one or more control messages received in the previous scheduling instance, and identifying the HARQ process ID associated with the at least one control message of the current scheduling instance, where the HARQ process ID associated with the one or more control messages received in the previous scheduling instance may be different from the HARQ process ID associated with the at least one control message of the current scheduling instance.

In some examples of the method, apparatuses, and non-transitory computer-readable medium described herein, receiving the set of data messages within the set of downlink subframes in the current scheduling instance may include operations, features, means, or instructions for receiving more than ten data messages within the set of downlink subframes in the current scheduling instance.

In some examples of the method, apparatuses, and non-transitory computer-readable medium described herein, receiving the set of data messages may include operations, features, means, or instructions for receiving the second subset of the set of data messages after a downlink shared channel scheduling delay of seven subframes.

In some examples of the method, apparatuses, and non-transitory computer-readable medium described herein, determining the feedback timing for each of the set of data messages may include operations, features, means, or instructions for determining a feedback delay for one of the set of data messages of twelve or thirteen subframes.

Some examples of the method, apparatuses, and non-transitory computer-readable medium described herein may further include operations, features, means, or instructions for receiving each of the set of data messages in a respective downlink subframe of at least eleven downlink subframes including the set of downlink subframes.

In some examples of the method, apparatuses, and non-transitory computer-readable medium described herein, receiving the at least one control message may include operations, features, means, or instructions for receiving a first control message of the at least one control message, the first control message scheduling multiple data messages.

Some examples of the method, apparatuses, and non-transitory computer-readable medium described herein may further include operations, features, means, or instructions for determining that the multiple data messages scheduled by the first control message exceeds a threshold number of data messages, and identifying a scheduling gap between a first portion of the multiple data messages that may be less than or equal to the threshold number and a second portion of the multiple data messages that exceeds the threshold number, where the scheduling gap facilitates receipt of the second portion of the multiple data messages in a next scheduling instance that follows the current scheduling instance.

In some examples of the method, apparatuses, and non-transitory computer-readable medium described herein, the threshold number of data messages may be ten.

In some examples of the method, apparatuses, and non-transitory computer-readable medium described herein, receiving the set of data messages further may include operations, features, means, or instructions for receiving the set of data messages within the set of downlink subframes in the current scheduling instance, where each downlink subframe of the set of downlink subframes includes a data message of the set of data messages.

In some examples of the method, apparatuses, and non-transitory computer-readable medium described herein, the current scheduling instance may be scheduled for an enhanced machine type communication (eMTC).

Some examples of the method, apparatuses, and non-transitory computer-readable medium described herein may further include operations, features, means, or instructions for identifying a set of HARQ process identifiers (IDs) corresponding to the set of data messages, where the set of HARQ process IDs includes at least twelve HARQ process IDs.

Some examples of the method, apparatuses, and non-transitory computer-readable medium described herein may further include operations, features, means, or instructions for overbooking a subset of the set of HARQ process identifiers.

Some examples of the method, apparatuses, and non-transitory computer-readable medium described herein may further include operations, features, means, or instructions for storing each of the set of HARQ process identifiers.

A method of wireless communications at a base station is described. The method may include transmitting at least one control message within a set of downlink subframes in a current scheduling instance, transmitting a set of data messages within the set of downlink subframes in the current scheduling instance, where a first subset of the set of data messages is transmitted in accordance with the at least one control message in the current scheduling instance, and where a second subset of the set of data messages is transmitted in accordance with one or more control messages transmitted in a previous scheduling instance, where a feedback timing for the first subset of the set of data messages is based on the at least one control message, and where the feedback timing for the second subset of the set of data messages is based on the one or more control messages transmitted in the previous scheduling instance, and receiving one or more bundled feedback responses during uplink subframes in the current scheduling instance and in accordance with the feedback timing for each of the set of data messages.

An apparatus for wireless communications at a base station is described. The apparatus may include a processor, memory coupled with the processor, and instructions stored in the memory. The instructions may be executable by the processor to cause the apparatus to transmit at least one control message within a set of downlink subframes in a current scheduling instance, transmit a set of data messages within the set of downlink subframes in the current scheduling instance, where a first subset of the set of data messages is transmitted in accordance with the at least one control message in the current scheduling instance, and where a second subset of the set of data messages is transmitted in accordance with one or more control messages transmitted in a previous scheduling instance, where a feedback timing for the first subset of the set of data messages is based on the at least one control message, and where the feedback timing for the second subset of the set of data messages is based on the one or more control messages transmitted in the previous scheduling instance, and receive one or more bundled feedback responses during uplink subframes in the current scheduling instance and in accordance with the feedback timing for each of the set of data messages.

Another apparatus for wireless communications at a base station is described. The apparatus may include means for transmitting at least one control message within a set of downlink subframes in a current scheduling instance, transmitting a set of data messages within the set of downlink subframes in the current scheduling instance, where a first subset of the set of data messages is transmitted in accordance with the at least one control message in the current scheduling instance, and where a second subset of the set of data messages is transmitted in accordance with one or more control messages transmitted in a previous scheduling instance, where a feedback timing for the first subset of the set of data messages is based on the at least one control message, and where the feedback timing for the second subset of the set of data messages is based on the one or more control messages transmitted in the previous scheduling instance, and receiving one or more bundled feedback responses during uplink subframes in the current scheduling instance and in accordance with the feedback timing for each of the set of data messages.

A non-transitory computer-readable medium storing code for wireless communications at a base station is described. The code may include instructions executable by a processor to transmit at least one control message within a set of downlink subframes in a current scheduling instance, transmit a set of data messages within the set of downlink subframes in the current scheduling instance, where a first subset of the set of data messages is transmitted in accordance with the at least one control message in the current scheduling instance, and where a second subset of the set of data messages is transmitted in accordance with one or more control messages transmitted in a previous scheduling instance, where a feedback timing for the first subset of the set of data messages is based on the at least one control message, and where the feedback timing for the second subset of the set of data messages is based on the one or more control messages transmitted in the previous scheduling instance, and receive one or more bundled feedback responses during uplink subframes in the current scheduling instance and in accordance with the feedback timing for each of the set of data messages.

In some examples of the method, apparatuses, and non-transitory computer-readable medium described herein, transmitting the set of data message may include operations, features, means, or instructions for transmitting the second subset of the set of data messages after a downlink shared channel scheduling delay that includes subframes for receipt of one or more additional bundled feedback responses during the previous scheduling instance.

In some examples of the method, apparatuses, and non-transitory computer-readable medium described herein, transmitting the at least one control message may include operations, features, means, or instructions for transmitting the at least one control message scheduling one or more additional data messages after a downlink shared channel scheduling delay that results in the one or more additional data messages being scheduled in a next scheduling instance after receipt of the one or more bundled feedback responses during uplink subframes in the current scheduling instance.

In some examples of the method, apparatuses, and non-transitory computer-readable medium described herein, transmitting the at least one control message may include operations, features, means, or instructions for transmitting a HARQ identifier (ID) field in a first control message of the at least one control message.

Some examples of the method, apparatuses, and non-transitory computer-readable medium described herein may further include operations, features, means, or instructions for selecting a value of the HARQ ID field greater than a HARQ ID field threshold, and indicating a downlink shared channel scheduling delay associated with the first control message using a HARQ acknowledgment (ACK) delay field included in the first control message, where the indicating may be based on the value of the HARQ ID field in the first control message being greater than the HARQ ID field threshold.

Some examples of the method, apparatuses, and non-transitory computer-readable medium described herein may further include operations, features, means, or instructions for selecting a value of the HARQ ID field greater than a HARQ ID field threshold, and indicating a HARQ process ID associated with the first control message using a HARQ acknowledgment (ACK) delay field in the first control message, where the indicating may be based on the value of the HARQ ID field in the first control message being greater than the HARQ ID field threshold.

Some examples of the method, apparatuses, and non-transitory computer-readable medium described herein may further include operations, features, means, or instructions for selecting a value of the HARQ ID field greater than a HARQ ID field threshold, and indicating a feedback delay associated with the first control message based on the HARQ ID field, where the indicating may be based on the HARQ ID field in the first control message being greater than the HARQ ID field threshold.

Some examples of the method, apparatuses, and non-transitory computer-readable medium described herein may further include operations, features, means, or instructions for selecting a value of the HARQ ID field less than or equal to a HARQ ID field threshold, and indicating based on the value of the HARQ ID field being less than or equal to the HARQ ID field threshold, a downlink shared channel scheduling delay associated with the first control message, a HARQ process ID associated with the first control message, and a feedback delay associated with the first control message, where the downlink shared channel scheduling delay may be a smaller of two available downlink shared channel scheduling delay values, the HARQ process ID may be equal to the value of the HARQ ID field, and the feedback delay may be indicated by a HARQ acknowledgment (ACK) delay field in the first control message.

In some examples of the method, apparatuses, and non-transitory computer-readable medium described herein, the two available downlink channel scheduling delay values include two downlink subframes and seven downlink subframes, where the determined downlink shared channel scheduling delay may be two downlink subframes based on the value of the HARQ ID field being less than or equal to the HARQ ID field threshold.

In some examples of the method, apparatuses, and non-transitory computer-readable medium described herein, transmitting the at least one control message may include operations, features, means, or instructions for transmitting an enhanced scheduling field in a first control message of the at least one control message, and indicating, based on a value of the enhanced scheduling field, a downlink shared channel scheduling delay associated with the first control message, a HARQ process identifier (ID) associated with the first control message, and a feedback delay associated with the first control message.

Some examples of the method, apparatuses, and non-transitory computer-readable medium described herein may further include operations, features, means, or instructions for indicating a HARQ process identifier (ID) associated with at least one of the one or more control messages transmitted in the previous scheduling instance, and indicating a hybrid automatic repeat request HARQ process ID associated with the at least one control message of the current scheduling instance, where the HARQ process ID associated with the at least one of the one or more control messages transmitted in the previous scheduling instance may be different from the HARQ process ID associated with the at least one control message of the current scheduling instance.

In some examples of the method, apparatuses, and non-transitory computer-readable medium described herein, transmitting the set of data messages within the set of downlink subframes in the current scheduling instance may include operations, features, means, or instructions for transmitting more than ten data messages within the set of downlink subframes in the current scheduling instance.

In some examples of the method, apparatuses, and non-transitory computer-readable medium described herein, transmitting the set of data messages may include operations, features, means, or instructions for transmitting the second subset of the set of data messages after a downlink shared channel scheduling delay of seven subframes.

Some examples of the method, apparatuses, and non-transitory computer-readable medium described herein may further include operations, features, means, or instructions for indicating a feedback delay for one of the set of data messages of twelve or thirteen subframes.

In some examples of the method, apparatuses, and non-transitory computer-readable medium described herein, transmitting the set of data messages may include operations, features, means, or instructions for transmitting each of the set of data messages in a respective downlink subframe of at least eleven downlink subframes including the set of downlink subframes.

In some examples of the method, apparatuses, and non-transitory computer-readable medium described herein, transmitting the at least one control message may include operations, features, means, or instructions for transmitting a first control message of the at least one control message, the first control message scheduling multiple data messages.

In some examples of the method, apparatuses, and non-transitory computer-readable medium described herein, transmitting the first control message may include operations, features, means, or instructions for determining that the multiple data messages scheduled by the first control message exceeds a threshold number of data messages, and identifying a scheduling gap between a first portion of the multiple data messages that may be less than or equal to the threshold number and a second portion of the multiple data messages that exceeds the threshold number, where the scheduling gap facilitates transmission of the second portion of the multiple data messages in a next scheduling instance that follows the current scheduling instance.

In some examples of the method, apparatuses, and non-transitory computer-readable medium described herein, the threshold number of data messages may be ten.

In some examples of the method, apparatuses, and non-transitory computer-readable medium described herein, transmitting the set of data messages may include operations, features, means, or instructions for transmitting the set of data messages within the set of downlink subframes in the current scheduling instance, where each downlink subframe of the set of downlink subframes includes a data message of the set of data messages.

In some examples of the method, apparatuses, and non-transitory computer-readable medium described herein, the current scheduling instance may be scheduled for an enhanced machine type communication (eMTC).

DETAILED DESCRIPTION

Figure 1:
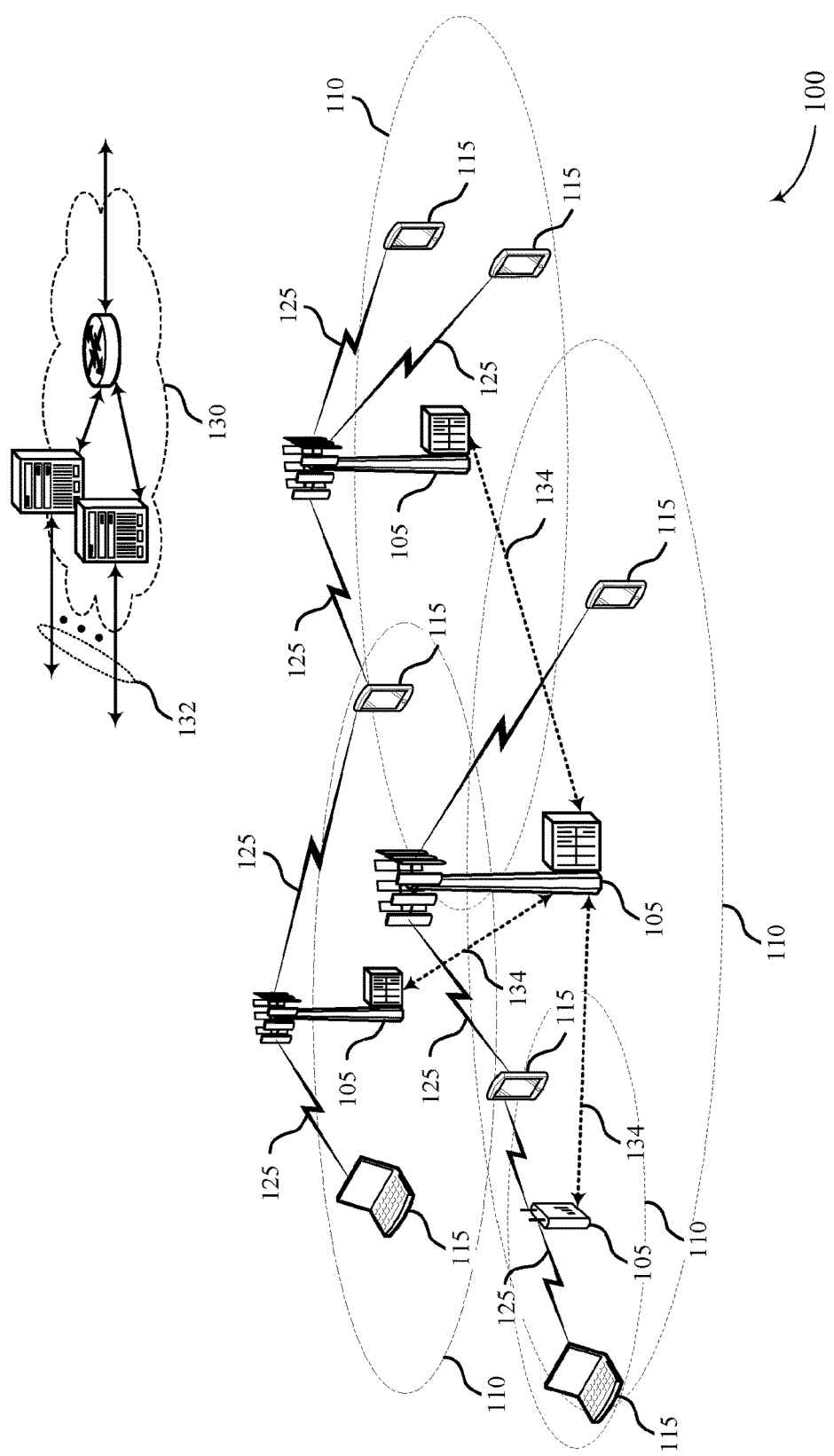
FIG. 1 illustrates an example of a system for wireless communications that supports scheduling for feedback response in accordance with aspects of the present disclosure.

Wireless communications systems may schedule communication resources according to a frame, scheduling period, or scheduling instance, which may correspond to a set of subframes. A scheduling instance (e.g., frame) may include a set of subframes allocated for downlink communications and a set of subframes for uplink communications. A downlink subframe may include resources allocated for control and scheduling information and resources allocated for data. In some cases, data messages may be scheduled in one or more downlink frames by a downlink control channel in the scheduling instance. Feedback responses (e.g., acknowledgements (ACKs) and negative-acknowledgement (NAKs)) for data messages in the frame may be allocated to the uplink subframes in the current scheduling instance or in a next scheduling instance. The implementations and techniques described herein may be utilized to increase the utilization of resources in a scheduling instance, and therefore increase communications efficiencies in a wireless communications system.

In some cases, a scheduling instance may include a set of downlink subframes and a set of uplink subframes. At least one control message transmitted in a downlink subframe may schedule a set of data messages in the downlink subframes of the scheduling instance. The downlink subframe may also include data messages scheduled by a control message of a previous scheduling instance. Further, feedback timings for data messages of the scheduling instance may be determined based on the corresponding control messages (e.g., from the current scheduling instance and the previous scheduling instance). Feedback responses corresponding to the data messages may be transmitted in a bundled manner in the set of uplink subframes. Using this cross-frame scheduling technique, the resources of a scheduling instance may be efficiently utilized.

Increased scheduling delay, hybrid automatic repeat request (HARQ) process alternation, and increased feedback timing delays may be implemented to support the efficient utilization of the scheduling instances. In some cases, the increased scheduling delay may be used by a control message in a current scheduling instance to schedule data resources in a next scheduling instance after transmission of bundled feedback responses for data messages in the current frame. The HARQ process alternation technique may be used to concurrently process HARQ processes associated with data scheduled by a previous scheduling instance and data scheduled by a current scheduling instance. The increased feedback timing delays may be used to transmit feedback (ACKS/NAKS) for the additional data messages in a scheduling instance. The techniques may be implemented based on downlink control information (DCI) field values or modification of DCI fields (e.g., increased DCI payload).

Aspects of the disclosure may be described with reference to a scheduling instance, but it should be understood that the features described may be implemented with respect to a frame, scheduling period, scheduling pattern, etc. For example, a set of downlink subframes may span multiple "frames," and as such, the features may be implemented respect to a scheduling instance. Accordingly, the use of the term "frame" should not be interpreted to describe one set of subframes with a downlink set of subframes and an uplink set of subframes, because a set of downlink subframes or uplink subframes may span multiple frames. A frame, scheduling instance, scheduling pattern, etc. may correspond to any set of subframes.

Aspects of the disclosure are initially described in the context of a wireless communications system. Aspects of the disclosure are further described with respect another wireless communications system, scheduling formats illustrating data scheduling and HARQ scheduling, DCI tables for scheduling, an example frame pattern, and a process flow diagram. Aspects of the disclosure are further illustrated by and described with reference to apparatus diagrams, system diagrams, and flowcharts that relate to scheduling for feedback response.

FIG. 1 illustrates an example of a wireless communications system 100 that supports scheduling for feedback response in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a device such as a cellular phone, a smart phone, a personal digital assistant (PDA), a multimedia/entertainment device (e.g., a radio, a MP3 player, a video device, etc.), a camera, a gaming device, a navigation/positioning device (e.g., GNSS (global navigation satellite system) devices based on, for example, GPS (global positioning system), Beidou, GLONASS, or Galileo, a terrestrial-based device, etc.), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may also refer to a wireless local loop (WLL) station, an Internet of Things (IoT) device, an Internet of Everything (IoE) device, or an MTC device, or the like, which may be implemented in various articles such as appliances, drones, robots, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307{,}200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

UEs 115 and base stations 105 may communicate using a frame scheduling technique described herein. For example, base station 105 may transmit a frame to a UE 115, where the frame includes a set of downlink subframes including a plurality of data messages. Some of the data messages in the downlink subframes of the current frame are scheduled based on at least one control message received in the current frame, while some of the data messages may be scheduled by one or more control messages in a previous frame.

The described techniques may be utilized to improve resource utilization and communication efficiency. On implementation may allow a UE 115 to process more data using fewer resources, or in other words, the UE 115 may be able to efficiently utilize existing resources. Because the UE 115 may be able to receive more data using the same or fewer resources, the UE 115 may save power and increase battery life.

In some cases, increased scheduling delay techniques may be implemented to support the frame scheduling. For example, a base station 105 may indicate (e.g., via DCI) a delayed schedule for a data message, where the delayed schedule indication schedules the data message in a next frame or scheduling instance after transmission of bundled feedback responses in the current frame or scheduling instance. To support such scheduling, a HARQ process alternation may be used such that a HARQ process corresponding to a data message scheduled by a previous scheduling instance may be processed in a current scheduling instance. The HARQ process may also include an indication of a feedback timing, and in some cases, the feedback timing may be increased (relative to current instance schedules) such that ACKs or NAKS corresponding to a data message received in a current scheduling instance may be transmitted in the current scheduling instance.

To support the various scheduling techniques, DCI may be used to indicate the various parameters. The DCI may be used to indicate an increased number of HARQ processes, indicate the modified HARQ ACK delay values, increased allowable PDSCH scheduling delay, etc. In some cases, the DCI may be used to indicate the various parameters without increasing the DCI payload size. For example, existing DCI fields may enable increased maximum throughput scheduling in DCI. In another case, the DCI payload may be increased to support the increased maximum throughput scheduling in DCI. For example, an additional bit, which may be referred to an enhanced scheduling field, may be used to support the increased maximum throughput scheduling. The techniques described herein may support ACK delay options of 12 and 13 subframes and PDSCH scheduling delays of N+7.

Figure 2:
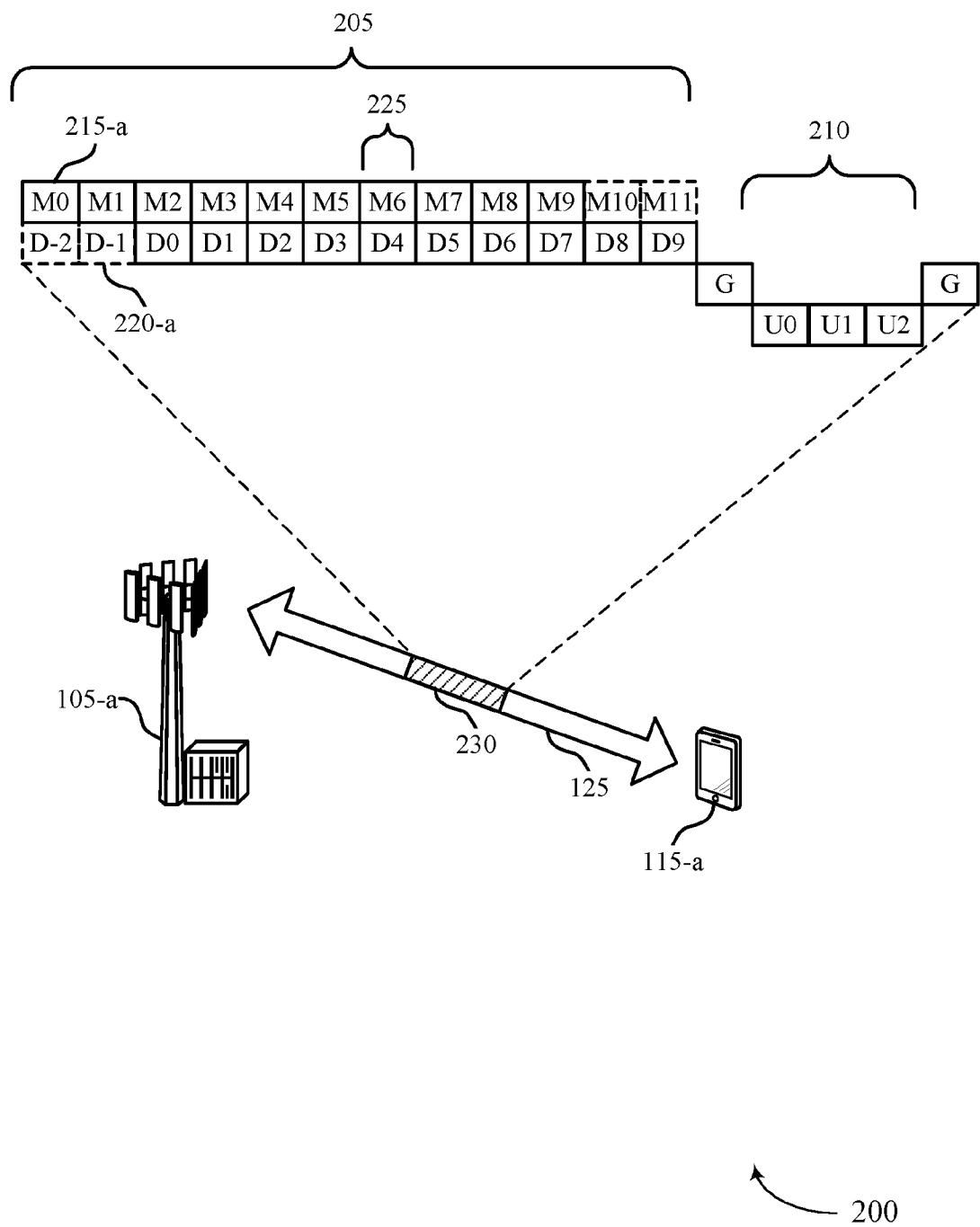
FIG. 2 illustrates an example of a communications system that supports scheduling for feedback response in accordance with aspects of the present disclosure.

FIG. 2 illustrates an example of a communications system 200 that supports scheduling for feedback response in accordance with various aspects of the present disclosure. In some examples, communications system 200 may implement aspects of wireless communication system 100. The communications system 200 includes base station 105-*a* and UE 115-*a*. The UE 115-*a* and the base station 105-*a* communicate over a communication link 125 and the communications may include downlink and uplink communications. The downlink and uplink communications may be allocated according to a one or more scheduling instances (e.g., frames), such as scheduling pattern 230. The scheduling pattern 230 is portioned into various subframes such as subframe 225. A set of subframes 205 may be allocated for downlink communications, while a set of subframes 210 may be allocated for uplink communications. Each subframe may include control resources, such as a control channel (e.g., a machine type communication physical downlink control channel (MPDCCH)), and data resources, such as a shared channel (e.g., physical downlink shared channel (PDSCH)). The control resources (e.g., a control message 215-*a*) may include information for scheduling the data resources (e.g., a data message 220-*a*). Accordingly, each subframe of the set of downlink subframes 205 may include a control message (e.g., control message 215-*a*) and a data message (e.g., data message 220-*a*).

A control message may schedule the timing of a data message as well as a feedback timing for each data message. The feedback timing may indicate a location in the set of uplink subframes 210 for transmitting a feedback response (e.g., hybrid automatic repeat request (HARQ) acknowledgement (ACK) or non-acknowledgement (NAK)) associated with the data message. In some cases, a particular control message may schedule multiple data messages, including the locations of the data messages (e.g., scheduling delay) as well as feedback timing for the data messages (e.g., feedback delay). In some cases, the scheduling information may be transmitted in a downlink control information (DCI) resource of the data channel. In some cases, the feedback is allocated to one of the subframes of the set of uplink subframes 210. For example, feedback associated with data message D1 may be allocated to uplink subframe U0, while feedback associated with data message D2 may be allocated to uplink subframe U1.

Using the techniques described herein, base station 105-*a* and the UE 115-*a* may communicate according to scheduling pattern 230, which may include data messages D-1 and D-2, as well as control messages M10 and M11. To achieve the illustrated scheduling pattern or instance 230 including the data messages D-1 and/or D-2 and control messages M10 and/or M11, a maximum number of HARQ processes may be increased, the HARQ ACK delay values may be modified, the allowable PDSCH scheduling delay may be increased, the fields in DCI may be modified without modifying the DCI payload size, and/or the DCI payload size may be increased. In some cases, some data messages of the scheduling pattern 230 may be scheduled according to a control message of the scheduling pattern 230, while other data messages of the scheduling pattern 230 may be scheduled according to one or more control messages of a previous frame. Accordingly, feedback timing for particular data messages may be scheduled according to a control message of the current scheduling pattern 230 or a control message from a previous scheduling pattern/instance.

In some cases, data messages D-2 and D-1 may be received after a downlink shared channel (e.g., PDSCH) scheduling delay that includes subframes for transmission of one or more additional bundled feedback responses during the previous scheduling instance. For example, a previous scheduling instance may include a set of downlink subframes including control and/or data messages, followed by a set of uplink subframes including resources for transmitting ACK/NAKs associated with the data messages. Further, the control messages in the previous scheduling instance may schedule a data message, such as D-2 and D-1, in the current scheduling pattern 230. Thus, the control messages in the previous scheduling instance may schedule receipt of data messages (in the current scheduling pattern 230) after transmission of one or more ACK/NACKs for data messages in the previous scheduling instance.

The described techniques may allow for the UE 115-*a* and the base station 105-*a* to utilize resources more efficiently. The UE 115-*a* may receive additional data from the base station via existing resources and using the scheduling techniques. For example, using the techniques described herein, the UE 115-*a* may receive data in data messages D-2 and/or D-1, which may not include resources in other scheduling instance allocation techniques. Accordingly, the UE 115-*a* and the base station 105-*a* may communicate more efficiently than is allowable in existing scheduling instance allocation techniques.

Figure 3A:
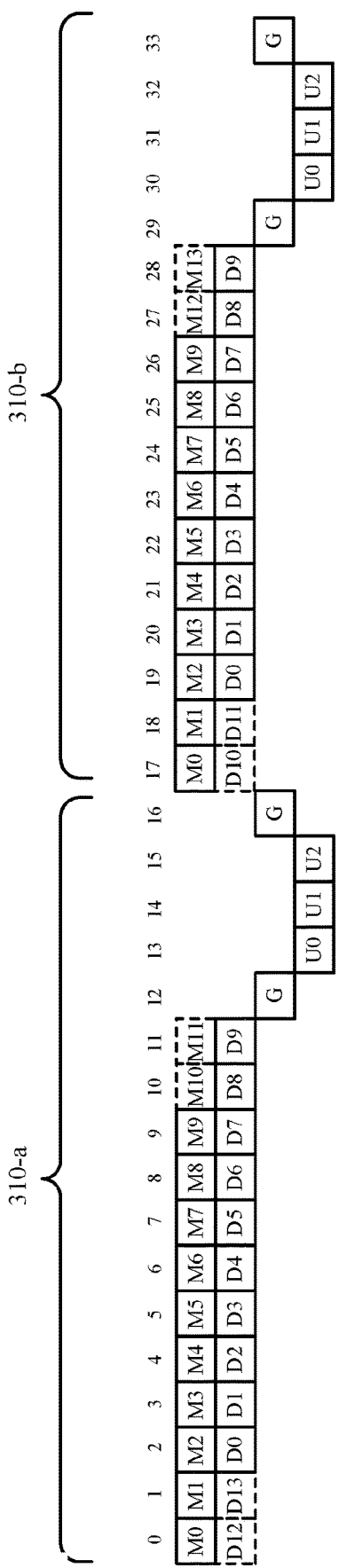
FIGS. 3A and 3B illustrates example frame formats that support scheduling for feedback response in accordance with aspects of the present disclosure.
Figure 3B:
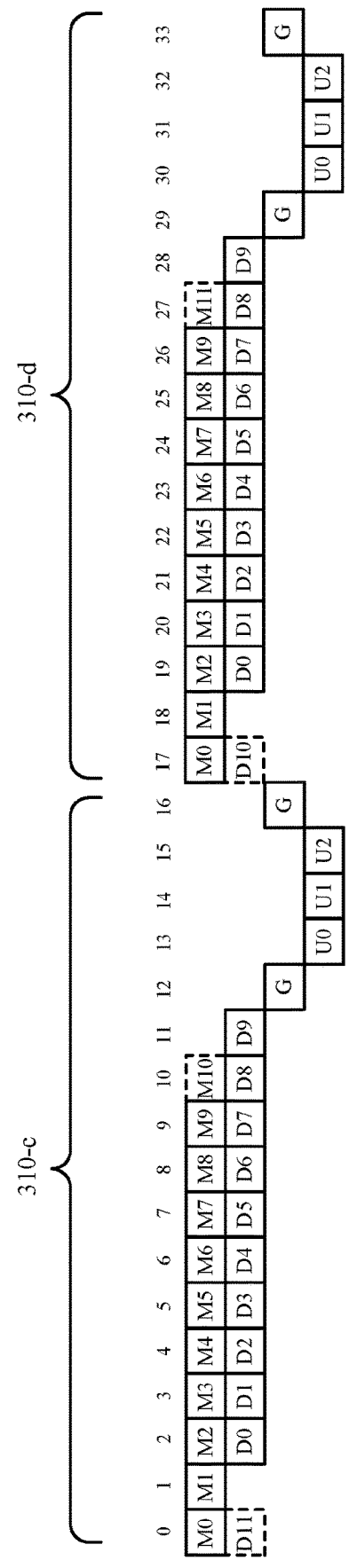

FIGS. 3A and 3B illustrate example scheduling instance formats 300 and 315 that support scheduling for feedback response in accordance with various aspects of the present disclosure. In some examples, frame scheduling instance 300 may be implemented by aspects of wireless communication system 100. The scheduling instances 300 and 315 include a set of subframes for downlink and a set of frames for uplink communications. The set of subframes allocated for downlink communications may include various control messages (e.g., M0 through M13) and various data messages (e.g., D0-D13). To achieve a peak throughput for the scheduling instances 300 and 315, the devices (e.g., UE 115 and base station 105) may utilize fourteen HARQ processes for HARQ scheduling and feedback for data messages of the scheduling instance. To support the fourteen HARQ processes, the UEs 115 may be allocated with a number of soft channel bits to handle the number of HARQ process. In other cases, the UE 115 may not support a number of soft channel bits to handle the number of HARQ processes. In such cases, the UE 115 may support overbooking of HARQ memory used for monitoring the HARQ processes. For example, a UE 115 may store received soft channel bits corresponding to a least 8 of the latest HARQ identifiers (IDs).

If the UE 115 supports a maximum of fourteen HARQ processes, the UE 115 may support the scheduling instance 300 illustrated in FIG. 3A. In the scheduling instance 300, the HARQ processes associated with control messages M10, M11, M12, and M13 may be scheduled alternatively. The alternative scheduling may be a result of the feedbacks (e.g., ACK/NAKs) associated with the control messages M10 and M11 being transmitted after the scheduling instance for the HARQ processes associated with M12 and M13. In other words, the feedbacks associated with control messages M10 and M11 may be transmitted in one of uplink subframes 30-32, which is after the control messages M12 and M13. Accordingly, the HARQ processes associated with M12 and M13 may be different from the HARQ processes associated with M10 and M11 (e.g., the HARQ process IDs are different). In some cases, the scheduling pattern 300 may have a maximum throughput of 706 kbps (e.g., (12 downlink subframes/17 total subframes)*1000 kbps=706 kbps).

In scheduling instance 300 of FIG. 3A, the data messages D12 and D13 of scheduling instance 310-a may be scheduled by one or more control messages in a previous scheduling instance. In some cases, scheduling instance 310-a may be a set of continuous downlink subframes, for example, as shown by continuous downlink subframes 0-11. Similarly, the data messages D10 an D11 of scheduling instance 310-b may be scheduled by one or more of the control messages in the previous scheduling instance 310-a. In some cases, a scheduling instance 310-b may be a set of continuous downlink subframes, for example, as shown by continuous downlink subframes 17-28. This scheduling may be the result of a scheduling delay indicated by the respective control messages. For example, control message M10 may indicate a scheduling delay of N+7 for data message D10.

If the UE supports a maximum of 12 HARQ processes, the UE 115 may support the pattern 315 illustrated in FIG. 3B. In the scheduling instance 315, the HARQ processes associated with control messages M10 and M11 may be alternatively scheduled. The alternative scheduling may be a result of the feedbacks (e.g., ACK/NAKs) associated with the control message M10 being transmitted after the scheduling instance for the HARQ processes associated with M11. In other words, the feedbacks associated with control message M10 may be transmitted in one of uplink subframes 30-32, which is after the control message M11. Accordingly, the HARQ processes associated with M11 may be different from the HARQ processes associated with M10. In some cases, the pattern 315 may have a maximum throughput of 647 kbps (e.g., (11 downlink subframes/17 total subframes)*1000 kbps=647 kbps).

In scheduling instance 315 of FIG. 3B, the data message D11 of scheduling instance 310-c may be scheduled by one or more control messages in a previous scheduling instance. In some cases, scheduling instance 310-c may be a set of continuous downlink subframes, for example, as shown by continuous downlink subframes 0-10. Similarly, the data messages D10 of scheduling instance 310-d may be scheduled by one or more of the control messages in the previous scheduling instance 310-c. In some cases, scheduling instance 310-d may be a set of continuous downlink subframes, for example, as shown by continuous downlink subframes 17-27.- This scheduling may be the result of a scheduling delay indicated by the respective control messages. For example, control message M10 may indicate a scheduling delay of N+7 for data message D10.

Figure 4A:
FIGS. 4A and 4B illustrates examples of tables that support scheduling for feedback response in accordance with aspects of the present disclosure.
Figure 4B:

FIGS. 4A and 4B illustrate examples of tables 400 and 430 that support scheduling for feedback response in accordance with various aspects of the present disclosure. In some examples, tables 400 and 430 may be implemented by aspects of wireless communication system 100. The tables 400 and 430 illustrate example values that may be used by UEs 115 and/or base stations 105 to schedule and determine resource and feedback schedules using the scheduling instances/patterns as described herein. The tables 400 and 430 may be used to determine HARQ IDs, scheduling delays, and feedback delays (e.g., ACK delays) based on various information included in DCI. DCI may include fields to indicate an ACK delay of 11 subframes, but the scheduling patterns (e.g., described with respect to FIG. 3) may utilize ACK delays of 12 or 13 subframes. Similarly, the DCI may support a PDSCH decoding delay (e.g., scheduling delay) of N+2, but the scheduling instances (e.g., described with respect to FIG. 3) may utilize a delay of N+7. DCI may support a 3 bit ACK delay field and a 4 bit HARQ ID field. Using the tables 400 and 430, the DCI may support ACK delays of 12 and 13 and PDSCH decoding delays of N+7 without increasing the DCI payload (e.g., adding another bit).

Information as illustrated in tables 400 and 430 may be used when a HARQ_ID field is greater than a threshold. In some cases, if the HARQ_ID value is <=9, then a scheduling delay may be determined as or allocated as N+2, the HARQ ID is the actual HARQ_ID field value, and the 3 bit ACK delay field points to a value in a ACK delay table. However, if the HARQ_ID field value is >9, then the used HARQ-ID, scheduling delay, and ACK delay may be determined based on the HARQ-ACK delay field and the HARQ_ID field and according to tables 400 and 430. The information illustrated in the tables 400 and 430 is merely illustrative, and it should be understood that other values may be utilized. If the HARQ-ID field value is greater than 9, then a HARQ-ACK delay field 405 in the DCI may be used to determine an actual HARQ ID 410 and a scheduling delay 415 as illustrated in table 400 of FIG. 4A. For example, if the HARQ_ID field is greater than 9, then a HARQ-ACK delay field 405 with a value "010" may indicate an actual HARQ ID 410 of 11 and a scheduling delay 415 of N+2. Similarly, if the HARQ_ID field is greater than 9, then a HARQ-ACK delay field 405 with a value "011" may indicate an actual HARQ ID 410 of 11 and a scheduling delay 415 of N+7.

Further, as illustrated in table 430 of FIG. 4B, the HARQ_ID field 420 may be used to determine a feedback timing (e.g., ACK delay 425) when the HARQ ID is greater than 9. For example, if the HARQ_ID field 420 has a value of 10, then the corresponding ACK delay 425 may be 4 subframes. Thus, using the techniques illustrated in the tables 400 and 430, a base station 105 may schedule data resources and corresponding feedback responses (e.g., HARQ processes and feedback timings) for a scheduling instance including resources as illustrated with respect to FIGS. 2 and 3. Further, a UE 115 may be configured to determine data schedules and feedback responses (e.g., HARQ process IDs and feedback timings) for scheduling instances included resources as illustrated with respect to FIGS. 2 and 3.

Figure 5:
FIG. 5 illustrates an example of a table that supports scheduling for feedback response in accordance with aspects of the present disclosure.

FIG. 5 illustrates an example of a table 500 that supports scheduling for feedback response in accordance with various aspects of the present disclosure. In some examples, table 500 may be implemented by aspects of wireless communication system 100. The table 500 illustrates possible scheduling parameters using an enhanced scheduling bit 510 as a DCI field. For example, DCI may include a HARQ_ACK delay field and an enhanced scheduling field 510 which may be used to indicate a HARQ_ACK delay value 515 and a scheduling delay 520. In one example, if the HARQ-ACK delay field 505 has a value of "101" and the enhanced scheduling field 510 has a value of "0" (or the enhanced scheduling is turned off), then the HARQ-Ack delay value 515 may be 9, and the scheduling delay 520 may be N+2. Similarly, if the if the HARQ-ACK delay field 505 includes a value of "101" and the enhanced scheduling field 510 includes a value of "1" (or the enhanced scheduling is turned on), then the HARQ_ACK delay value 515 may be 9, and the scheduling delay 520 may be N+7. It should be understood that the values includes in table 500 are for illustrative purposes only and that other values may be included in accordance with aspects of the present disclosure. In some cases, the scheduling technique supported by table 500 by including a 4 bit HARQ-ACK delay field or adding a separate field. In either case, the bit may be referred to as an enhanced scheduling field.

Figure 6:
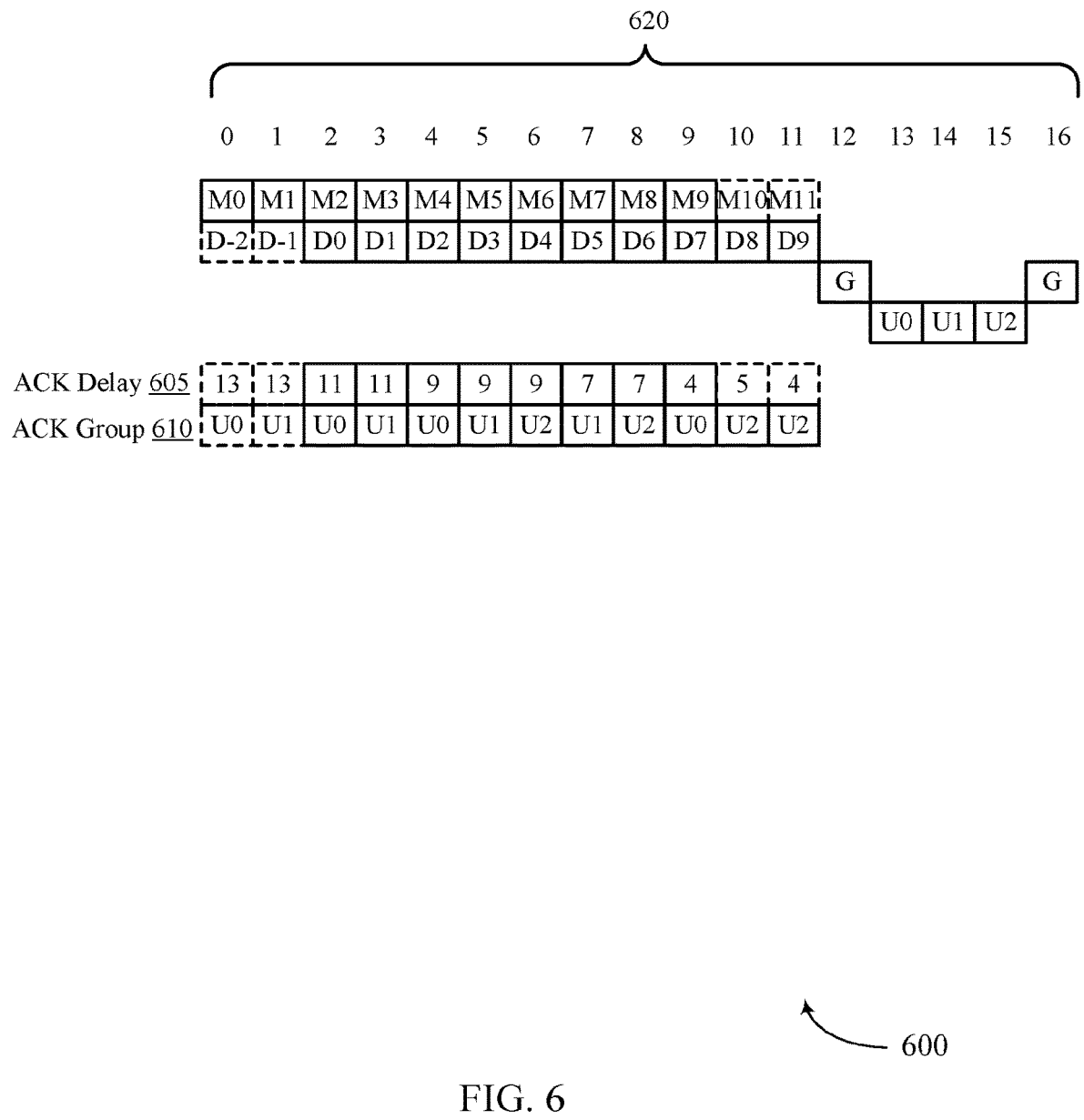
FIG. 6 illustrates an example of a frame schedule that supports scheduling for feedback response in accordance with aspects of the present disclosure.

FIG. 6 illustrates. an example of a scheduling pattern or instance 600 that supports scheduling for feedback response in accordance with aspects of the present disclosure. In some examples, scheduling pattern 600 may implement aspects of wireless communication system 100. The scheduling pattern 600 includes an example frame (e.g., scheduling instance) 620 with corresponding ACK delays 605 and ACK groups 610. The ACK delays 605 and the ACK groups 610 may corresponding to the respective subframes of scheduling instance620. For example, an ACK delay 605 corresponding to data message M3 (e.g., subframe 3) may be 11, and the ACK group 610 may be U0. Thus, a feedback response (e.g., ACK or NAK) for data message D1 may be transmitted 11 subframes after the data message D1 is received, which corresponds to ACK group U0. (e.g., subframe 13 of an set of uplink subframes).

The feedback responses may be transmitted in a bundled manner such that multiple ACK/NAKS for multiple data messages may be transmitted in the same scheduling instance or frame. In some cases, a NAK is transmitted when at least one of the data messages corresponding to a bundle results in a NAK. For example, for ACK group U0, if one of the data messages D-2, D0, D2, or D6 results in a NAK response, then the NAK may be transmitted in uplink subframe 13 (e.g., group U0). However, if none of the data messages corresponding to group U0 need a NAK, then an ACK may be transmitted in uplink subframe 13 (e.g., group U0). The scheduling techniques as described with respect to FIGS. 2 through 5 may be utilized to implement the bundled feedbacks as illustrated in the example scheduling pattern 600.

Data messages D-2 and D-1 may be scheduled by one or more control messages in a previous scheduling instance. Further, control messages M10 and M11 may schedule one or more data messages in a next scheduling instance. The scheduling pattern 600 may correspond to maximum throughput scheduling. In some cases, the scheduling pattern 600 may be implemented with less than a maximum throughput schedule. For example, the scheduling instance 620 may include control messages up to M10 (e.g., M11 is not included) and data messages up to D-1 (e.g., D-2 is not included). In some cases, scheduling instance 620 may include a scheduling instance comprising a set of continuous downlink subframes, for example, as shown by continuous downlink subframes 0-11.

In some cases, the scheduling techniques described herein may support up to twelve data messages per scheduling instance 620 (e.g., as illustrated by scheduling pattern 600). In some cases, the amount of data messages may be configured by a higher layer parameter. For example, if a throughput enhanced parameter is set to "ON," then a parameter indicating a number of data messages may be set to 12.

In some examples, multiple data messages may be scheduled by a single control message (e.g., a single DCI). Accordingly, a single DCI may schedule each of messages D0 through D9 and an additional two data messages (e.g., D-2 and D-1) in a next scheduling instance. Accordingly, ten data messages (transmission blocks (TBs)) may be scheduled back to back, and then a fixed scheduling delay may be indicated for the data messages in the next scheduling instance (e.g., TB 10/11). One example technique to implement such scheduling may include determining whether the number of TBs is less than or equal to a threshold (e.g., 10). If the number of TBs is less than the threshold (e.g., 10), then the TBs may be scheduled back to back, then a gap is introduced for HARQ-ACK feedback. Any remaining TBs (e.g., greater than the threshold) may be transmitted after the HARQ-ACK feedback.

Figure 7:
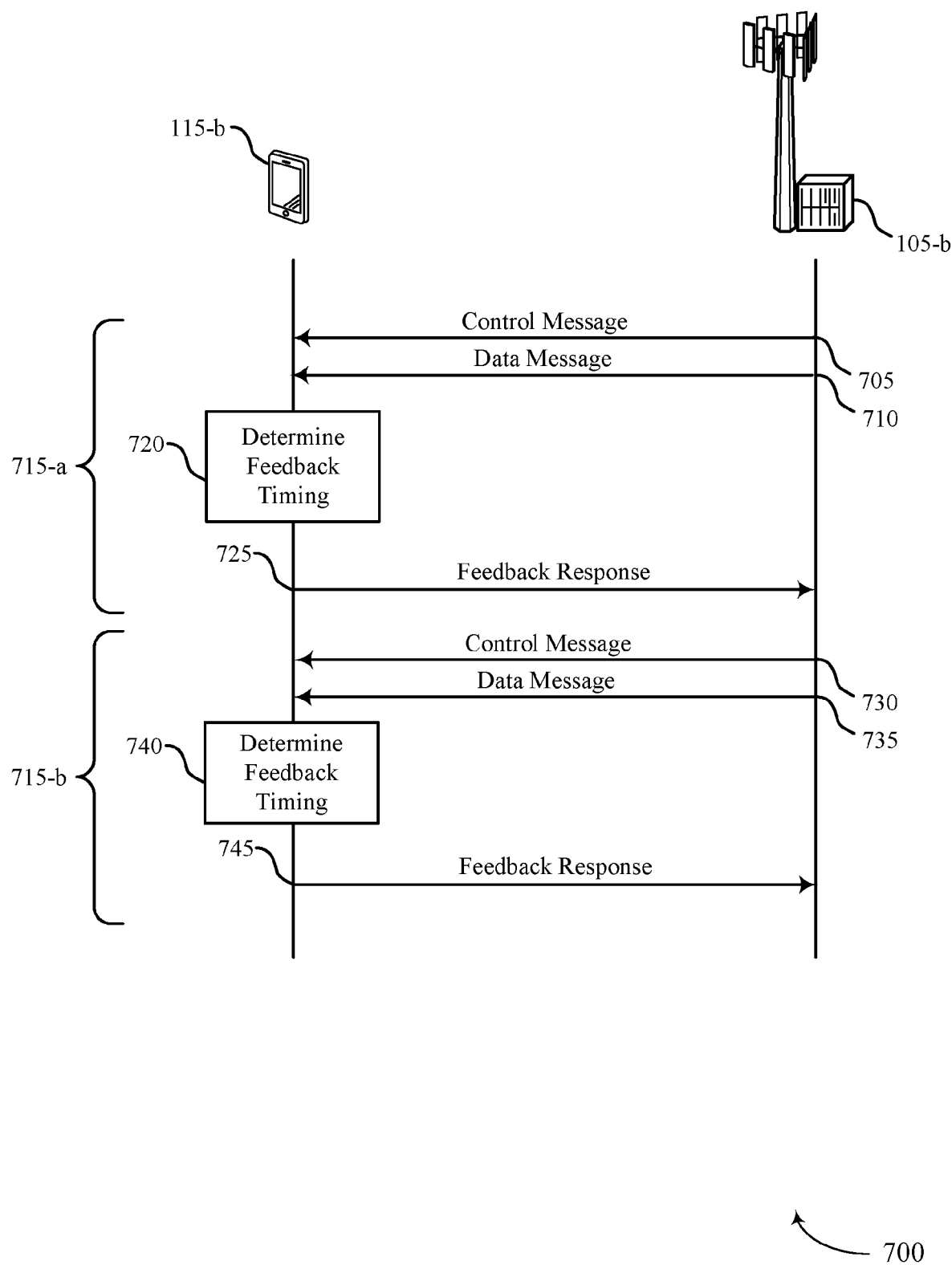
FIG. 7 illustrates an example of a process flow diagram that supports scheduling for feedback response in accordance with aspects of the present disclosure.

FIG. 7 illustrates an example of a process flow diagram 700 that supports scheduling instance scheduling for feedback response in accordance with aspects of the present disclosure. In some examples, process flow 700 may illustrate aspects of wireless communication system 100. The process flow 700 may include a base station 105-*b* and UE 115-*b*. At 705, the base station 105-*b* may transmit at least one control message in within a set of downlink subframes in a current scheduling instance 715-*a* to the UE 115-*b*. At 710, the base station 105-*b* transmits a plurality data messages to the UE 115-*b* within the set of downlink subframes in the current scheduling instance 715-*a*. A first subset of the plurality of data messages may transmitted in accordance with the at least one control message transmitted at 705, while another subset of the plurality of data messages is transmitted in accordance with one or more control messages of the previous scheduling instance.

At 715, the UE 115-*b* determines the feedback timing for each of the plurality of data messages. The feedback timing for the first subset of the plurality of data messages may be based on the at least one control messages, and the feedback timing for the second subset of the plurality of data messages may be based on the one or more control messages received in the previous scheduling instance.

At 725, the UE 115-*b* transmits one or more bundled feedback responses during uplink subframes in the current scheduling instance 715-*a* to the base station 105-*b*.

At 730, the base station 105-*b* may transmit at least one control message within a set of downlink subframes in a next scheduling instance 715-*b* to the UE 115-*b*. At 735, the base station 105-*b* transmits a plurality of data messages to the UE 115-*b* within the set of downlink subframes in the next scheduling instance 715-*b*. A first subset of the plurality of data messages may be transmitted in accordance with the at least one control message transmitted at 730, while another subset of the plurality of data messages is transmitted in accordance with one or more control messages of the previous scheduling instance 715-*a*.

At 740, the UE 115-*b* determines the feedback timing for each of the plurality of data messages. The feedback timing for the first subset of the plurality of data messages may be based on the at least one control messages received at 730, and the feedback timing for the second subset of the plurality of data messages may be based on the one or more control messages received in the previous scheduling instance 715-*a* (e.g., received at 705).

At 745, the UE 115-*b* transmits one or more bundled feedback responses during uplink subframes in the current scheduling instance 715-*a* to the base station 105-*b*.

Figure 8:
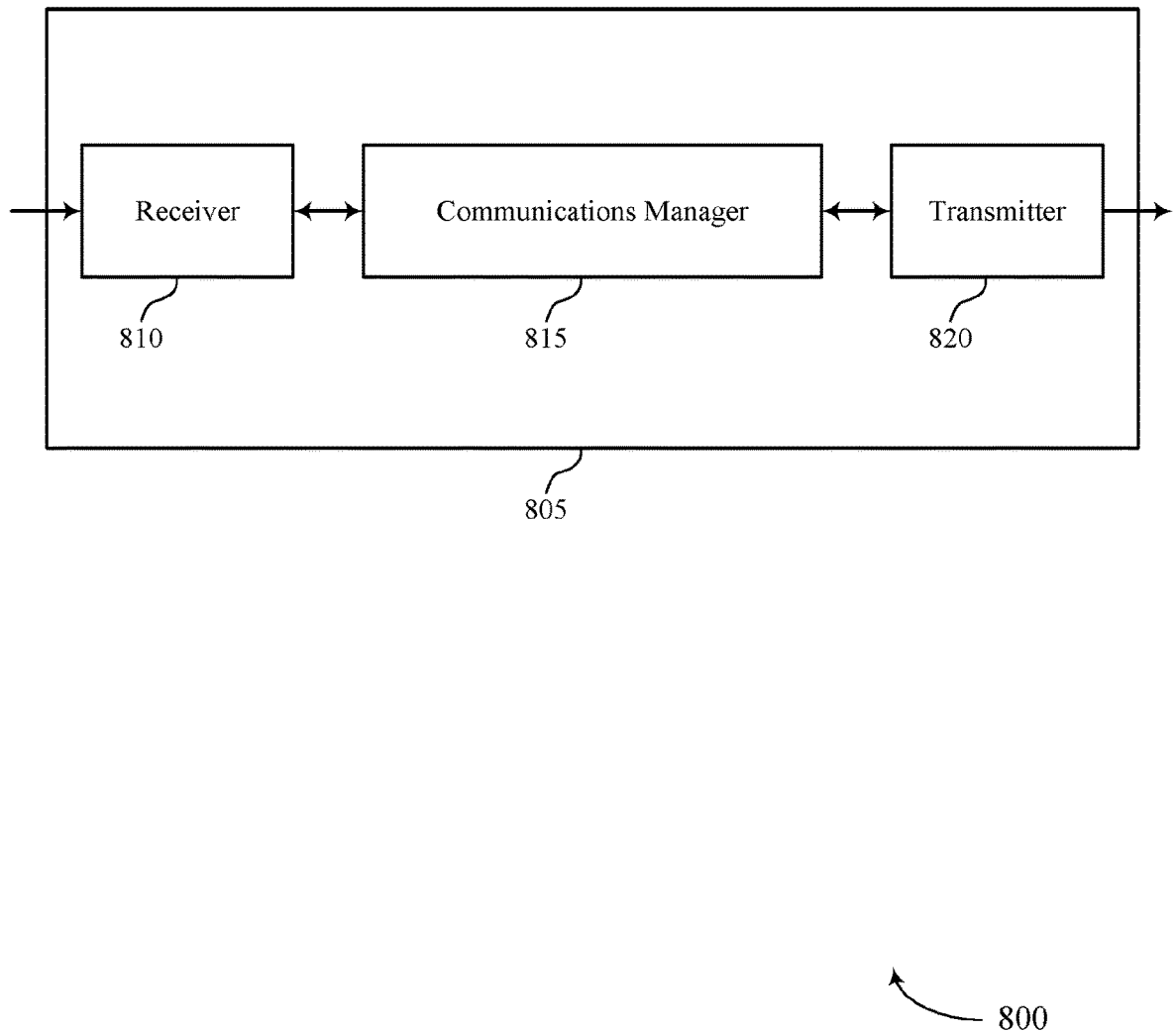
FIGS. 8 and 9 show block diagrams of devices that support scheduling for feedback response in accordance with aspects of the present disclosure.

FIG. 8 shows a block diagram 800 of a device 805 that supports scheduling instance scheduling for feedback response in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to scheduling instance scheduling for feedback response, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive at least one control message within a set of downlink subframes in a current scheduling instance, receive a set of data messages within the set of downlink subframes in the current scheduling instance, where a first subset of the set of data messages is received in accordance with the at least one control message in the current scheduling instance, and where a second subset of the set of data messages is received in accordance with one or more control messages received in a previous scheduling instance, determine a feedback timing for each of the set of data messages, where the feedback timing for the first subset of the set of data messages is based on the at least one control message, and where the feedback timing for the second subset of the set of data messages is based on the one or more control messages received in the previous scheduling instance, and transmit one or more bundled feedback responses during uplink subframes in the current scheduling instance and in accordance with the feedback timing for each of the set of data messages. The communications manager 815 may be an example of aspects of the communications manager 1110 described herein.

The communications manager 815, or its sub-components, may be implemented in hardware, software (e.g., executed by a processor), or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 815 as described herein may be implemented to realize one or more potential advantages. On implementation may allow a UE 115 to process more data using fewer resources, or in other words, the UE 115 may be able to efficiently utilize existing resources. Because the UE 115 may be able to receive more data using the same or fewer resources, the UE 115 may save power and increase battery life.

Based on receiving data scheduled by control messages in a current scheduling instance and data scheduled by control messages in a previous scheduling instance, a processor of a UE 115 (e.g., controlling the receiver 810 and the transmitter 820) may efficiently receive and process the data scheduled by the previous scheduling instance. The processor of the UE 115 may activate one or more processing units for receiving the scheduled data, increasing the processing clock, or a similar mechanism within the UE 115. As such, when the data scheduled by the previous scheduling instance is received, the processor may be ready to respond more efficiently (e.g., based on scheduled feedback timing) through the reduction of ramp up in processing power.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
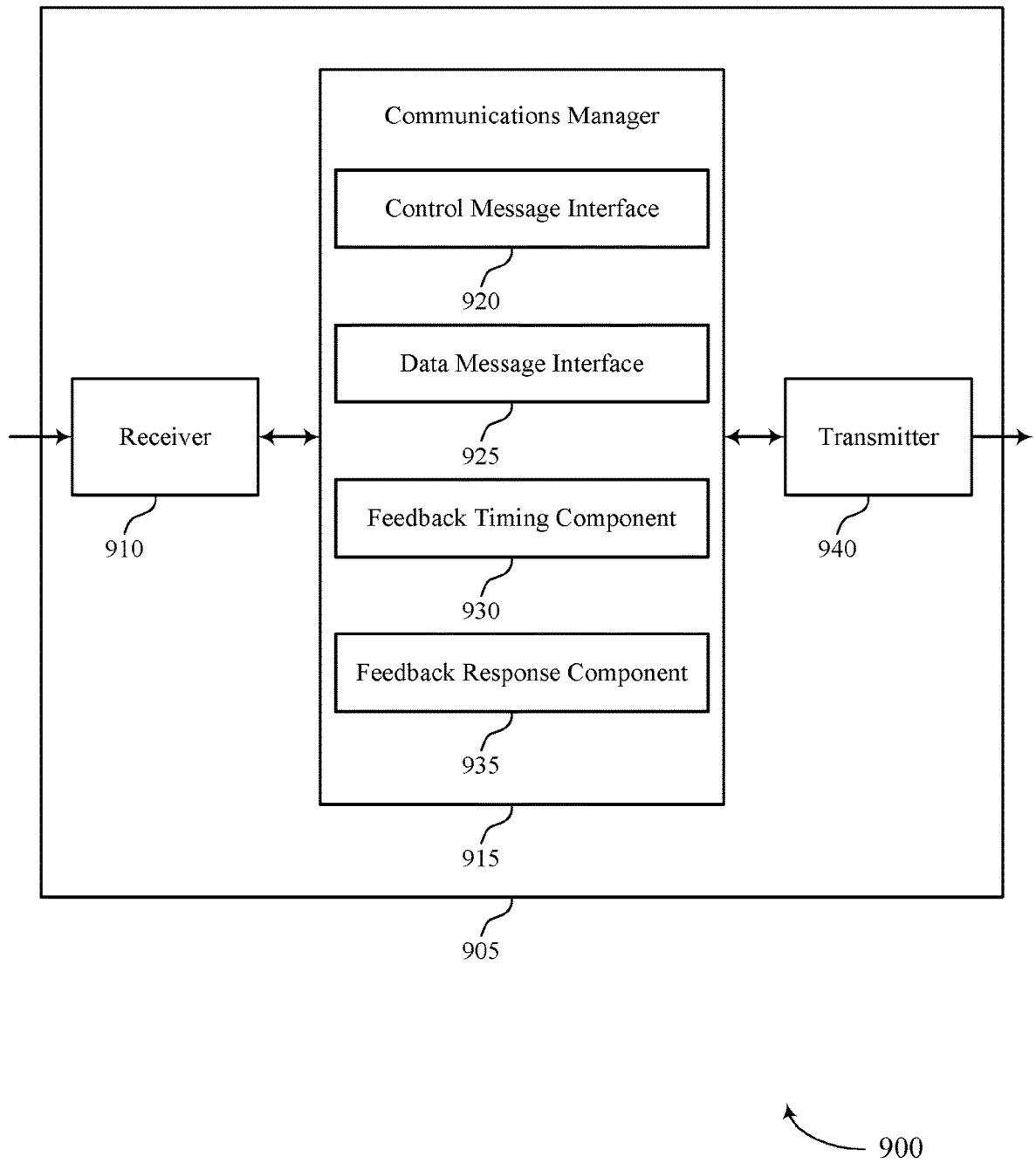

FIG. 9 shows a block diagram 900 of a device 905 that supports scheduling instance scheduling for feedback response in accordance with aspects of the present disclosure. The device 905 may be an example of aspects of a device 805, or a UE 115 as described herein. The device 905 may include a receiver 910, a communications manager 915, and a transmitter 940. The device 905 may also include a processor. Each of these components may be in communication with one another (e.g., via one or more buses).

The receiver 910 may receive information such as packets, user data, or control information associated with various information channels (e.g., control channels, data channels, and information related to scheduling instance scheduling for feedback response, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a control message interface 920, a data message interface 925, a feedback timing component 930, and a feedback response component 935. The communications manager 915 may be an example of aspects of the communications manager 1110 described herein. The control message interface 920 may receive at least one control message within a set of downlink subframes in a current scheduling instance.

The data message interface 925 may receive a set of data messages within the set of downlink subframes in the current scheduling instance, where a first subset of the set of data messages is received in accordance with the at least one control message in the current scheduling instance, and where a second subset of the set of data messages is received in accordance with one or more control messages received in a previous scheduling instance.

The feedback timing component 930 may determine a feedback timing for each of the set of data messages, where the feedback timing for the first subset of the set of data messages is based on the at least one control message, and where the feedback timing for the second subset of the set of data messages is based on the one or more control messages received in the previous scheduling instance. The feedback response component 935 may transmit one or more bundled feedback responses during uplink subframes in the current scheduling instance and in accordance with the feedback timing for each of the set of data messages.

The transmitter 940 may transmit signals generated by other components of the device 905. In some examples, the transmitter 940 may be collocated with a receiver 910 in a transceiver module. For example, the transmitter 940 may be an example of aspects of the transceiver 1120 described with reference to FIG. 11. The transmitter 940 may utilize a single antenna or a set of antennas.

Figure 10:
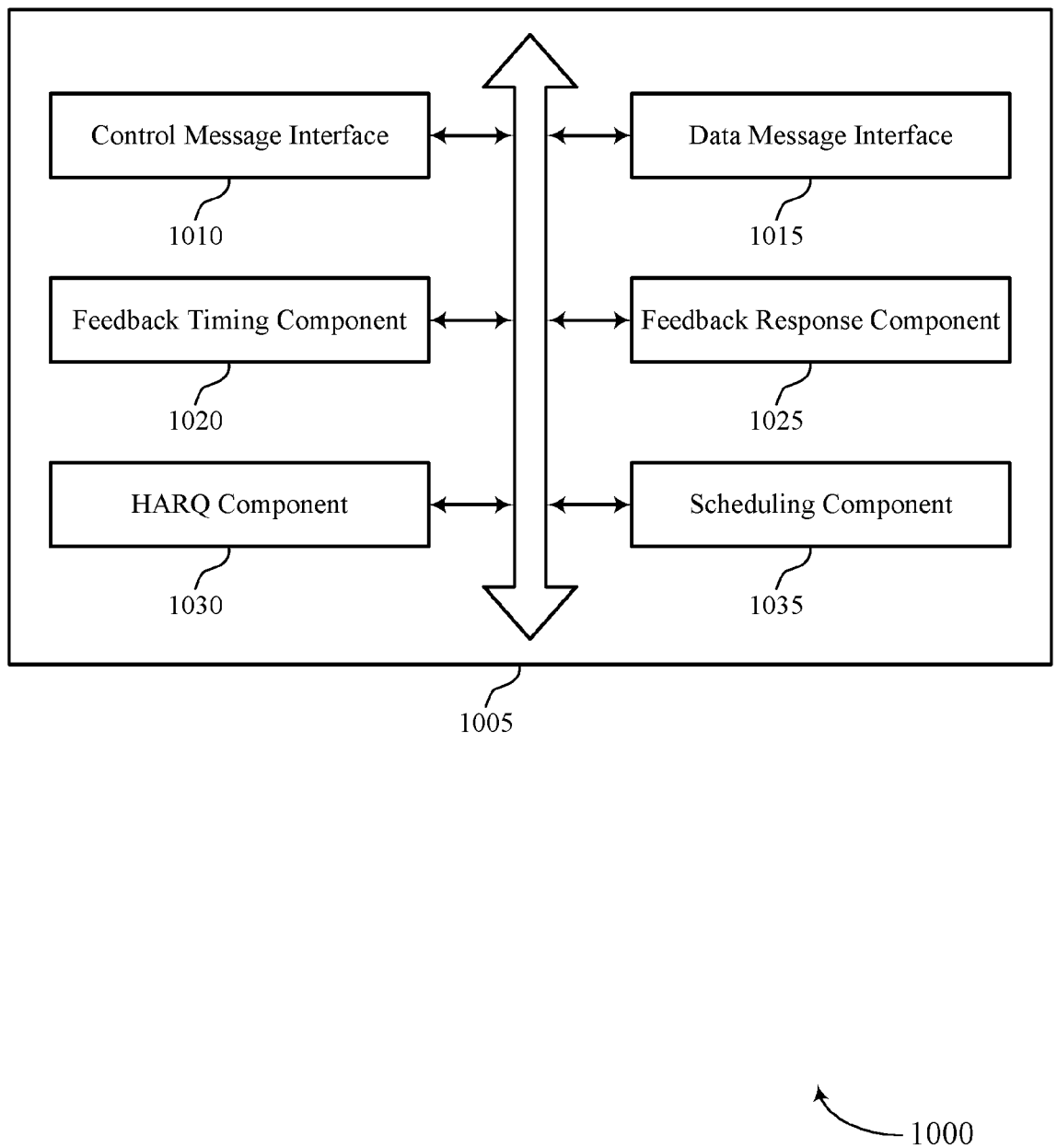
FIG. 10 shows a block diagram of a communications manager that supports scheduling for feedback response in accordance with aspects of the present disclosure.

FIG. 10 shows a block diagram 1000 of a communications manager 1005 that supports scheduling instance scheduling for feedback response in accordance with aspects of the present disclosure. The communications manager 1005 may be an example of aspects of a communications manager 815, a communications manager 915, or a communications manager 1110 described herein. The communications manager 1005 may include a control message interface 1010, a data message interface 1015, a feedback timing component 1020, a feedback response component 1025, a HARQ component 1030, and a scheduling component 1035. Each of these modules may communicate, directly or indirectly, with one another (e.g., via one or more buses). The control message interface 1010 may receive at least one control message within a set of downlink subframes in a current scheduling instance.

In some examples, the control message interface 1010 may receive the at least one control message scheduling one or more additional data messages after a downlink shared channel scheduling delay that results in the one or more additional data messages being scheduled in a next scheduling instance after transmission of the one or more bundled feedback responses during uplink subframes in the current scheduling instance. In some examples, the control message interface 1010 may receive a first control message of the at least one control message, the first control message scheduling multiple data messages.

The data message interface 1015 may receive a set of data messages within the set of downlink subframes in the current scheduling instance, where a first subset of the set of data messages is received in accordance with the at least one control message in the current scheduling instance, and where a second subset of the set of data messages is received in accordance with one or more control messages received in a previous scheduling instance.

In some examples, the data message interface 1015 may receive the second subset of the set of data messages after a downlink shared channel scheduling delay that includes subframes for transmission of one or more additional bundled feedback responses during the previous scheduling instance. In some examples, the data message interface 1015 may receive more than ten data messages within the set of downlink subframes in the current scheduling instance. In some examples, the data message interface 1015 may receive the second subset of the set of data messages after a downlink shared channel scheduling delay of seven subframes.

In some examples, the data message interface 1015 may receive each of the set of data messages in a respective downlink subframe of at least eleven downlink subframes including the set of downlink subframes. In some examples, the data message interface 1015 may receive the set of data messages within the set of downlink subframes in the current scheduling instance, where each downlink subframe of the set of downlink subframes includes a data message of the set of data messages.

The feedback timing component 1020 may determine a feedback timing for each of the set of data messages, where the feedback timing for the first subset of the set of data messages is based on the at least one control message, and where the feedback timing for the second subset of the set of data messages is based on the one or more control messages received in the previous scheduling instance. In some examples, the feedback timing component 1020 may determine a feedback delay associated with the first control message based on the HARQ ID field. In some examples, the feedback timing component 1020 may determine a feedback delay for one of the set of data messages of twelve or thirteen subframes. The feedback response component 1025 may transmit one or more bundled feedback responses during uplink subframes in the current scheduling instance and in accordance with the feedback timing for each of the set of data messages.

In some cases, the current scheduling instance is scheduled for an enhanced machine type communication (eMTC). The HARQ component 1030 may process concurrent HARQ processes associated with the at least one control message received within the set of downlink subframes of the current scheduling instance and with the one or more control messages received in the previous scheduling instance.

In some examples, the HARQ component 1030 may identify a HARQ identifier (ID) field in a first control message of the at least one control message. In some examples, the HARQ component 1030 may compare a value of the HARQ ID field included in the first control message with a HARQ ID field threshold.

In some examples, the HARQ component 1030 may determine that the value of the HARQ ID field in the first control message is greater than the HARQ ID field threshold. In some examples, the HARQ component 1030 may determine a HARQ process ID associated with the first control message based on a HARQ ACK delay field in the first control message.

In some examples, the HARQ component 1030 may determine, based on the value of the HARQ ID field being less than or equal to the HARQ ID field threshold, a downlink shared channel scheduling delay associated with the first control message, a HARQ process ID associated with the first control message, and a feedback delay associated with the first control message, where the downlink shared channel scheduling delay is a smaller of two available downlink shared channel scheduling delay values, the HARQ process ID is equal to the value of the HARQ ID field, and the feedback delay is indicated by a HARQ ACK delay field in the first control message.

In some examples, the two available downlink channel scheduling delay values comprise two downlink subframes and seven downlink subframes, and the HARQ component 1030 may determine the downlink shared channel scheduling delay as two downlink subframes based on the value of the HARQ ID field being less than or equal to the HARQ ID field threshold.

In some examples, the HARQ component 1030 may identify an enhanced scheduling field in a first control message of the at least one control message. In some examples, the HARQ component 1030 may determine, based on a value of the enhanced scheduling field, a downlink shared channel scheduling delay associated with the first control message, a HARQ process identifier (ID) associated with the first control message, and a feedback delay associated with the first control message.

In some examples, the HARQ component 1030 may identify a HARQ process identifier (ID) associated with each of the one or more control messages received in the previous scheduling instance. In some examples, the HARQ component 1030 may identify a hybrid automatic repeat request HARQ process ID associated with the at least one control message of the current scheduling instance, where the HARQ process ID associated with the one or more control messages received in the previous scheduling instance are different from the HARQ process ID associated with the at least one control message of the current scheduling instance.

In some examples, the HARQ component 1030 may identify a plurality of hybrid automatic repeat request (HARQ) process identifiers (IDs) corresponding to the plurality of data messages, where the plurality of HARQ process IDs comprises at least twelve HARQ process IDs. In some cases, the HARQ component 1030 may overbook a subset of the plurality of HARQ process identifiers. In some cases, the HARQ component 1030 may store each of the plurality of HARQ process identifiers.

The scheduling component 1035 may determine a downlink shared channel scheduling delay associated with the first control message based on a HARQ ACK delay field in the first control message. In some examples, the scheduling component 1035 may determine that the multiple data messages scheduled by the first control message exceeds a threshold number of data messages.

In some examples, the scheduling component 1035 may identify a scheduling gap between a first portion of the multiple data messages that is less than or equal to the threshold number and a second portion of the multiple data messages that exceeds the threshold number, where the scheduling gap facilitates receipt of the second portion of the multiple data messages in a next scheduling instance that follows the current scheduling instance. In some cases, the threshold number of data messages is ten.

Figure 11:
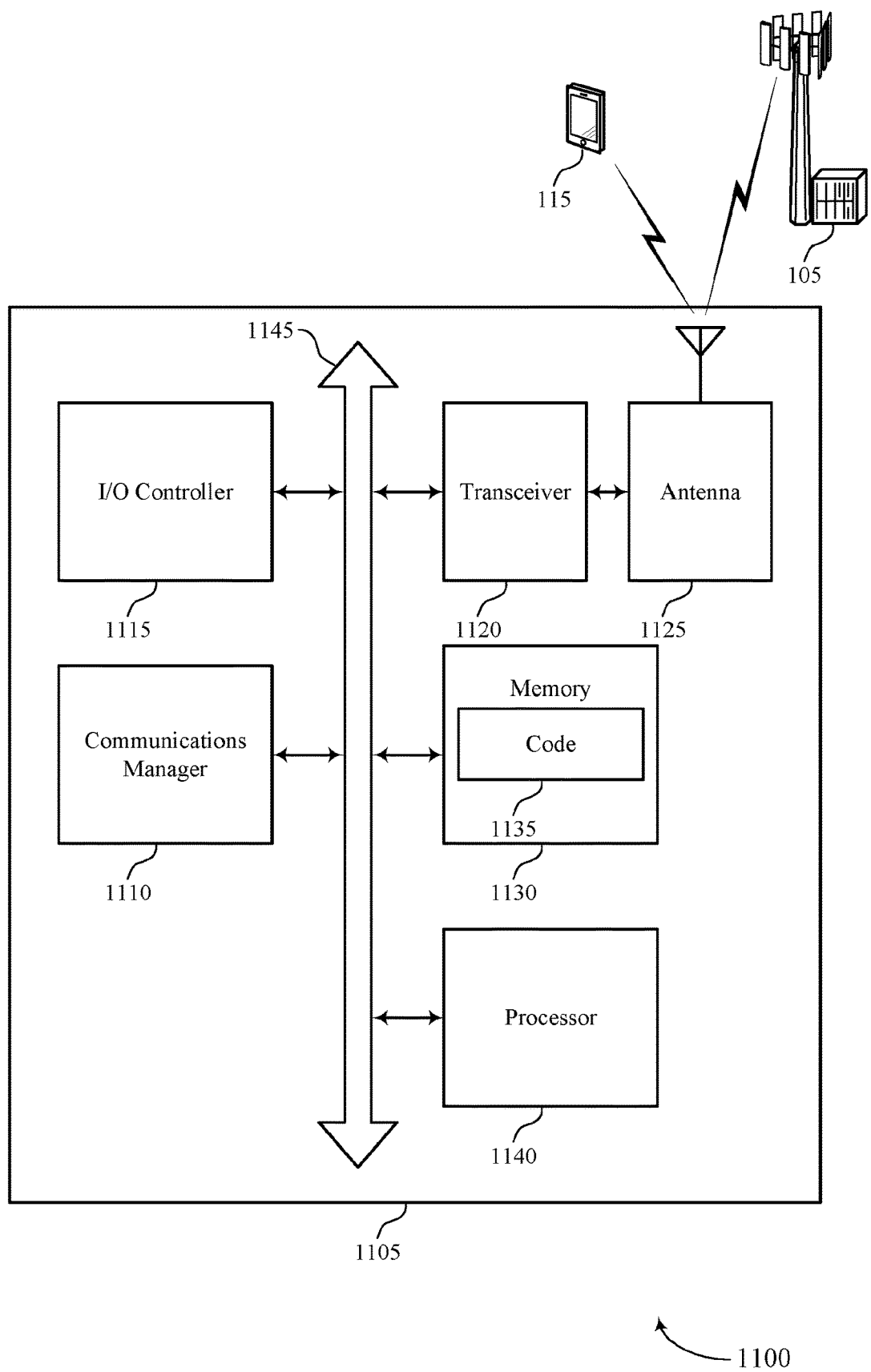
FIG. 11 shows a diagram of a system including a device that supports scheduling for feedback response in accordance with aspects of the present disclosure.

FIG. 11 shows a diagram of a system 1100 including a device 1105 that supports scheduling instance scheduling for feedback response in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may receive at least one control message within a set of downlink subframes in a current scheduling instance, receive a set of data messages within the set of downlink subframes in the current scheduling instance, where a first subset of the set of data messages is received in accordance with the at least one control message in the current scheduling instance, and where a second subset of the set of data messages is received in accordance with one or more control messages received in a previous scheduling instance, determine a feedback timing for each of the set of data messages, where the feedback timing for the first subset of the set of data messages is based on the at least one control message, and where the feedback timing for the second subset of the set of data messages is based on the one or more control messages received in the previous scheduling instance, and transmit one or more bundled feedback responses during uplink subframes in the current scheduling instance and in accordance with the feedback timing for each of the set of data messages.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting scheduling instance scheduling for feedback response).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
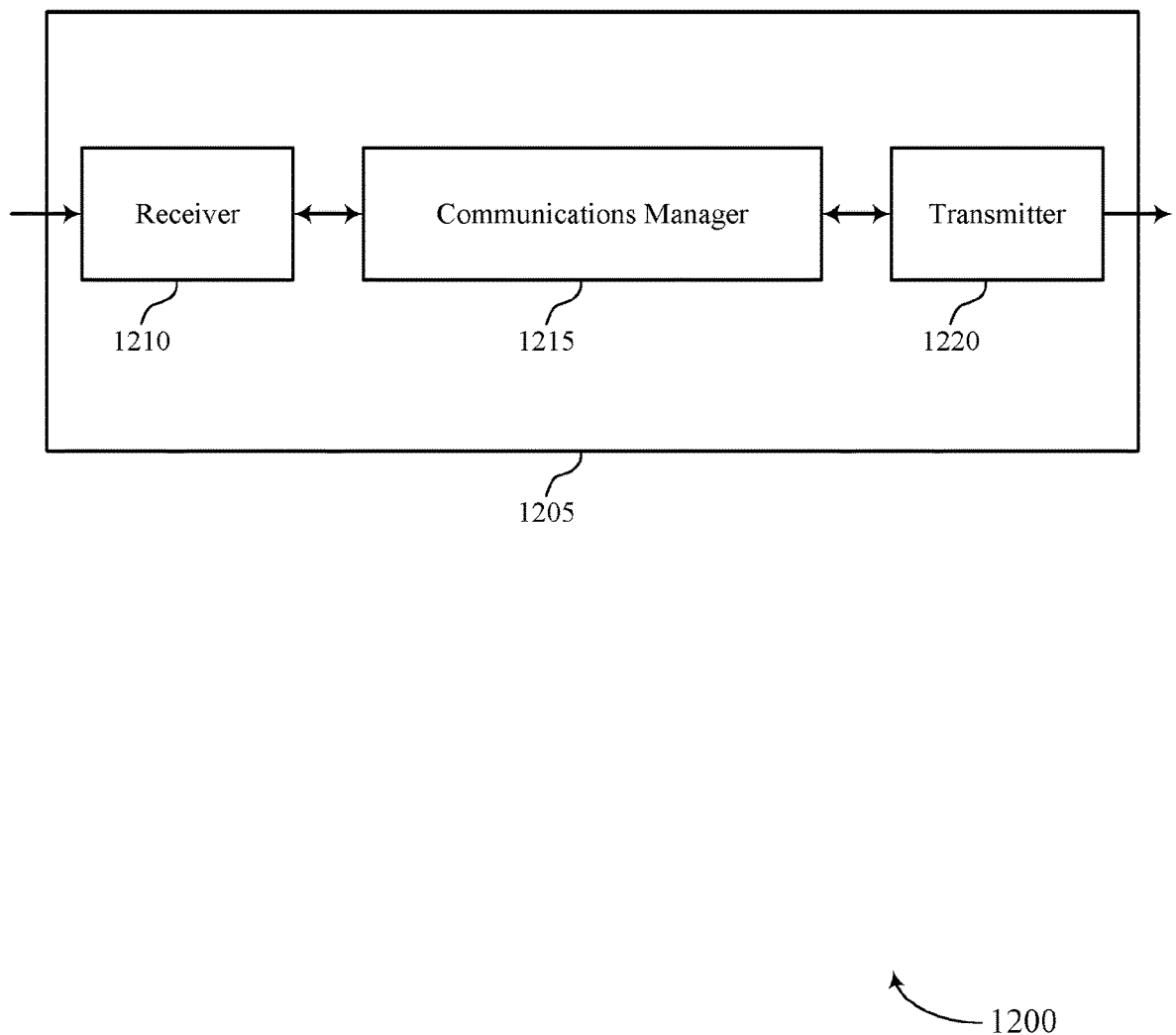
FIGS. 12 and 13 show block diagrams of devices that support scheduling for feedback response in accordance with aspects of the present disclosure.

FIG. 12 shows a block diagram 1200 of a device 1205 that supports scheduling instance scheduling for feedback response in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to scheduling instance scheduling for feedback response, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may transmit at least one control message within a set of downlink subframes in a current scheduling instance, transmit a set of data messages within the set of downlink subframes in the current scheduling instance, where a first subset of the set of data messages is transmitted in accordance with the at least one control message in the current scheduling instance, and where a second subset of the set of data messages is transmitted in accordance with one or more control messages transmitted in a previous scheduling instance, where a feedback timing for the first subset of the set of data messages is based on the at least one control message, and where the feedback timing for the second subset of the set of data messages is based on the one or more control messages transmitted in the previous scheduling instance, and receive one or more bundled feedback responses during uplink subframes in the current scheduling instance and in accordance with the feedback timing for each of the set of data messages. The communications manager 1215 may be an example of aspects of the communications manager 1510 described herein.

The communications manager 1215, or its sub-components, may be implemented in hardware, software (e.g., executed by a processor), or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
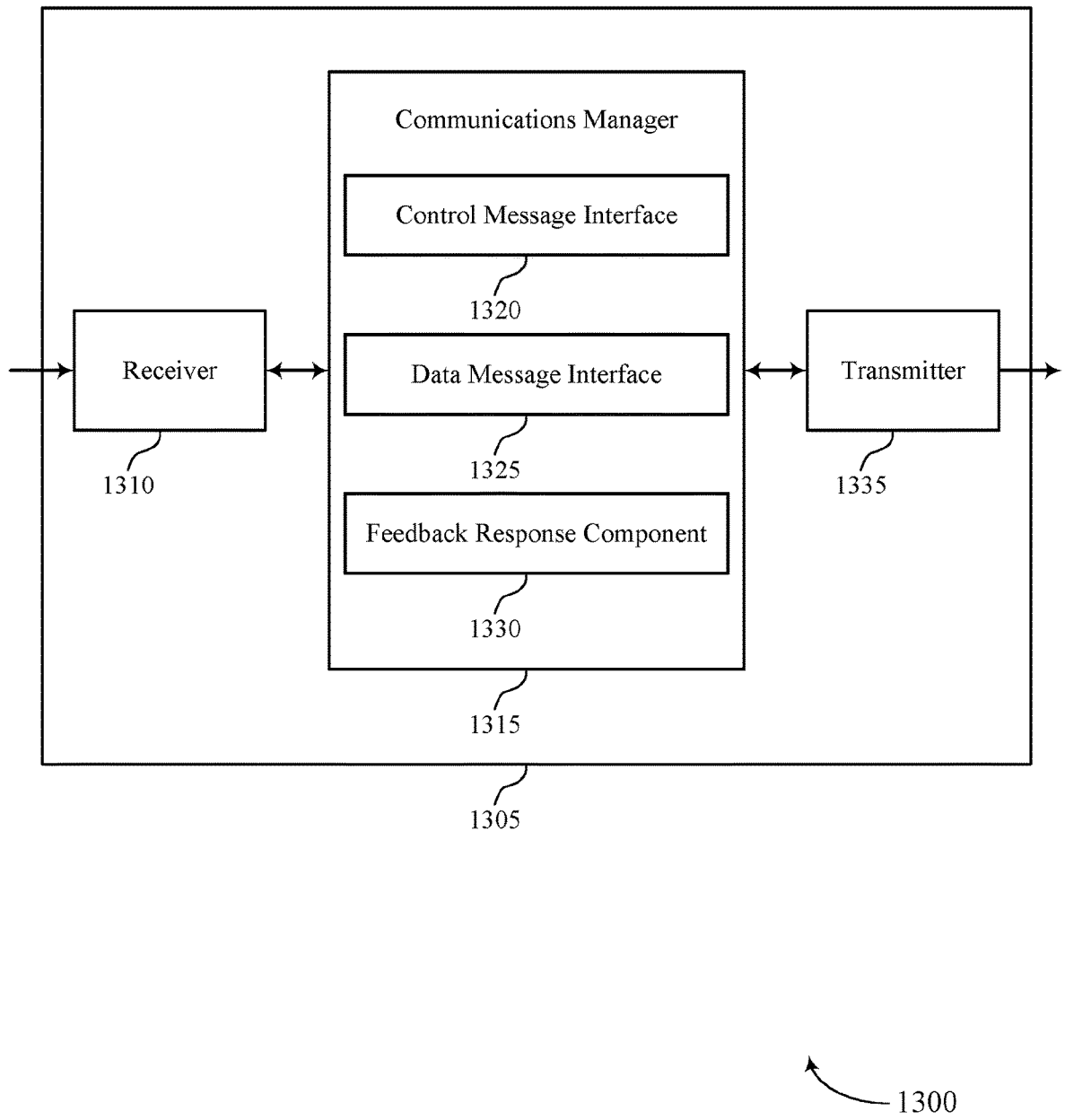

FIG. 13 shows a block diagram 1300 of a device 1305 that supports scheduling instance scheduling for feedback response in accordance with aspects of the present disclosure. The device 1305 may be an example of aspects of a device 1205, or a base station 105 as described herein. The device 1305 may include a receiver 1310, a communications manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to scheduling instance scheduling for feedback response, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a control message interface 1320, a data message interface 1325, and a feedback response component 1330. The communications manager 1315 may be an example of aspects of the communications manager 1510 described herein. The control message interface 1320 may transmit at least one control message within a set of downlink subframes in a current scheduling instance.

The data message interface 1325 may transmit a set of data messages within the set of downlink subframes in the current scheduling instance, where a first subset of the set of data messages is transmitted in accordance with the at least one control message in the current scheduling instance, and where a second subset of the set of data messages is transmitted in accordance with one or more control messages transmitted in a previous scheduling instance, where a feedback timing for the first subset of the set of data messages is based on the at least one control message, and where the feedback timing for the second subset of the set of data messages is based on the one or more control messages transmitted in the previous scheduling instance. The feedback response component 1330 may receive one or more bundled feedback responses during uplink subframes in the current scheduling instance and in accordance with the feedback timing for each of the set of data messages.

The transmitter 1335 may transmit signals generated by other components of the device 1305. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
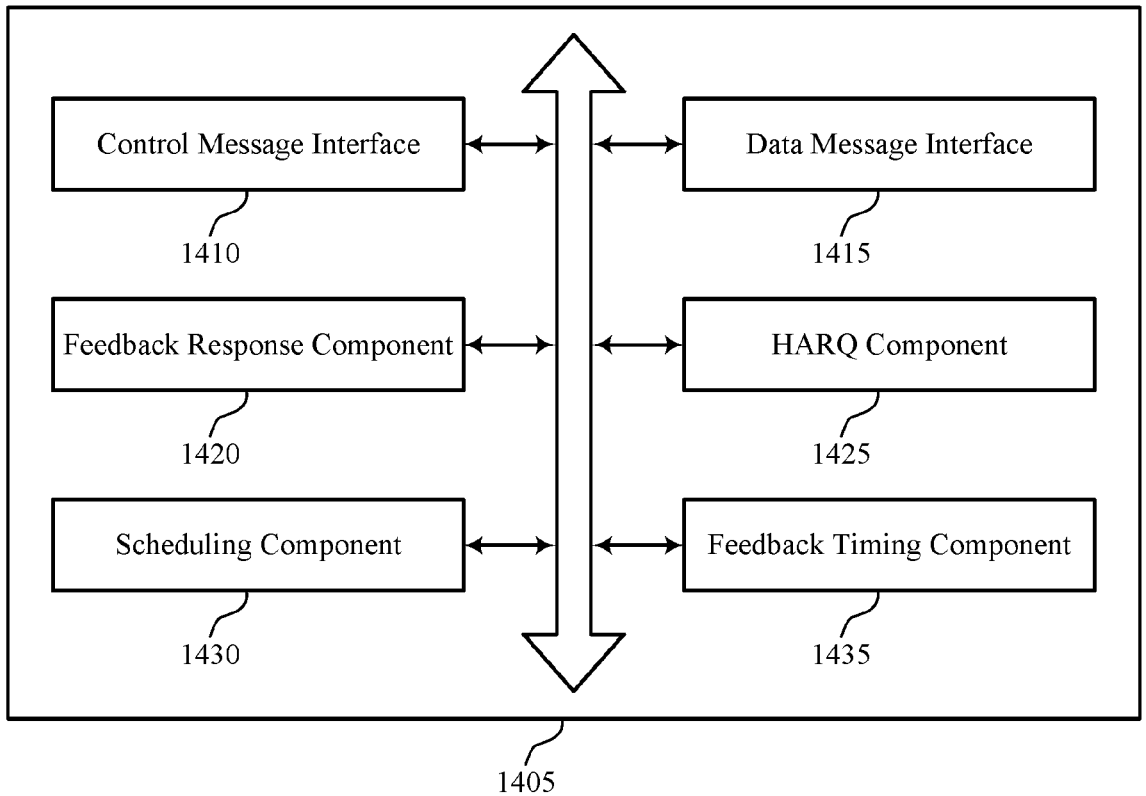
FIG. 14 shows a block diagram of a communications manager that supports scheduling for feedback response in accordance with aspects of the present disclosure.

FIG. 14 shows a block diagram 1400 of a communications manager 1405 that supports scheduling instance scheduling for feedback response in accordance with aspects of the present disclosure. The communications manager 1405 may be an example of aspects of a communications manager 1215, a communications manager 1315, or a communications manager 1510 described herein. The communications manager 1405 may include a control message interface 1410, a data message interface 1415, a feedback response component 1420, a HARQ component 1425, a scheduling component 1430, and a feedback timing component 1435. Each of these modules may communicate, directly or indirectly, with one another (e.g., via one or more buses). The control message interface 1410 may transmit at least one control message within a set of downlink subframes in a current scheduling instance.

In some examples, the control message interface 1410 may transmit the at least one control message scheduling one or more additional data messages after a downlink shared channel scheduling delay that results in the one or more additional data messages being scheduled in a next scheduling instance after receipt of the one or more bundled feedback responses during uplink subframes in the current scheduling instance. In some examples, the control message interface 1410 may transmit a first control message of the at least one control message, the first control message scheduling multiple data messages.

The data message interface 1415 may transmit a set of data messages within the set of downlink subframes in the current scheduling instance, where a first subset of the set of data messages is transmitted in accordance with the at least one control message in the current scheduling instance, and where a second subset of the set of data messages is transmitted in accordance with one or more control messages transmitted in a previous scheduling instance, where a feedback timing for the first subset of the set of data messages is based on the at least one control message, and where the feedback timing for the second subset of the set of data messages is based on the one or more control messages transmitted in the previous scheduling instance.

In some examples, the data message interface 1415 may transmit the second subset of the set of data messages after a downlink shared channel scheduling delay that includes subframes for receipt of one or more additional bundled feedback responses during the previous scheduling instance. In some examples, the data message interface 1415 may transmit more than ten data messages within the set of downlink subframes in the current scheduling instance.

In some examples, the data message interface 1415 may transmit the second subset of the set of data messages after a downlink shared channel scheduling delay of seven subframes. In some examples, the data message interface 1415 may transmit each of the set of data messages in a respective downlink subframe of at least eleven downlink subframes including the set of downlink subframes. In some examples, the data message interface 1415 may determine that the multiple data messages scheduled by the first control message exceeds a threshold number of data messages.

In some examples, the data message interface 1415 may transmit the set of data messages within the set of downlink subframes in the current scheduling instance, where each downlink subframe of the set of downlink subframes includes a data message of the set of data messages. The feedback response component 1420 may receive one or more bundled feedback responses during uplink subframes in the current scheduling instance and in accordance with the feedback timing for each of the set of data messages.

The HARQ component 1425 may transmit a HARQ identifier (ID) field in a first control message of the at least one control message. In some examples, the HARQ component 1425 may select a value of the HARQ ID field greater than a HARQ ID field threshold.

In some examples, the HARQ component 1425 may indicate a HARQ process ID associated with the first control message using a HARQ acknowledgment (ACK) delay field in the first control message, where the indicating is based on the value of the HARQ ID field in the first control message being greater than the HARQ ID field threshold. In some examples, the HARQ component 1425 may select a value of the HARQ ID field less than or equal to a HARQ ID field threshold.

In some examples, the HARQ component 1425 may indicate based on the value of the HARQ ID field being less than or equal to the HARQ ID field threshold, a downlink shared channel scheduling delay associated with the first control message, a HARQ process ID associated with the first control message, and a feedback delay associated with the first control message, where the downlink shared channel scheduling delay is a smaller of two available downlink shared channel scheduling delay values, the HARQ process ID is equal to the value of the HARQ ID field, and the feedback delay is indicated by a HARQ acknowledgment (ACK) delay field in the first control message. In some examples, the HARQ component 1425 may indicate a HARQ process identifier (ID) associated with at least one of the one or more control messages transmitted in the previous scheduling instance.

In some examples, the two available downlink channel scheduling delay values are two downlink subframes and seven downlink subframes, and HARQ component 1425 may determine the downlink shared channel scheduling delay of two downlink subframes based on the value of the HARQ ID field being less than or equal to the HARQ ID field threshold.

In some examples, the HARQ component 1425 may indicate a hybrid automatic repeat request HARQ process ID associated with the at least one control message of the current scheduling instance, where the HARQ process ID associated with the at least one of the one or more control messages transmitted in the previous scheduling instance is different from the HARQ process ID associated with the at least one control message of the current scheduling instance.

The scheduling component 1430 may indicate a downlink shared channel scheduling delay associated with the first control message using a HARQ acknowledgment (ACK) delay field included in the first control message, where the indicating is based on the value of the HARQ ID field in the first control message being greater than the HARQ ID field threshold. In some examples, the scheduling component 1430 may transmit an enhanced scheduling field in a first control message of the at least one control message.

In some examples, the scheduling component 1430 may indicate, based on a value of the enhanced scheduling field, a downlink shared channel scheduling delay associated with the first control message, a HARQ process identifier (ID) associated with the first control message, and a feedback delay associated with the first control message. In some examples, the scheduling component 1430 may indicate a feedback delay for one of the set of data messages of twelve or thirteen subframes.

In some examples, the scheduling component 1430 may identify a scheduling gap between a first portion of the multiple data messages that is less than or equal to the threshold number and a second portion of the multiple data messages that exceeds the threshold number, where the scheduling gap facilitates transmission of the second portion of the multiple data messages in a next scheduling instance that follows the current scheduling instance. In some cases, the threshold number of data messages is ten.

The feedback timing component 1435 may indicate a feedback delay associated with the first control message based on the HARQ ID field, where the indicating is based on the HARQ ID field in the first control message being greater than the HARQ ID field threshold. In some cases, the current scheduling instance is scheduled for an enhanced machine type communication (eMTC).

Figure 15:
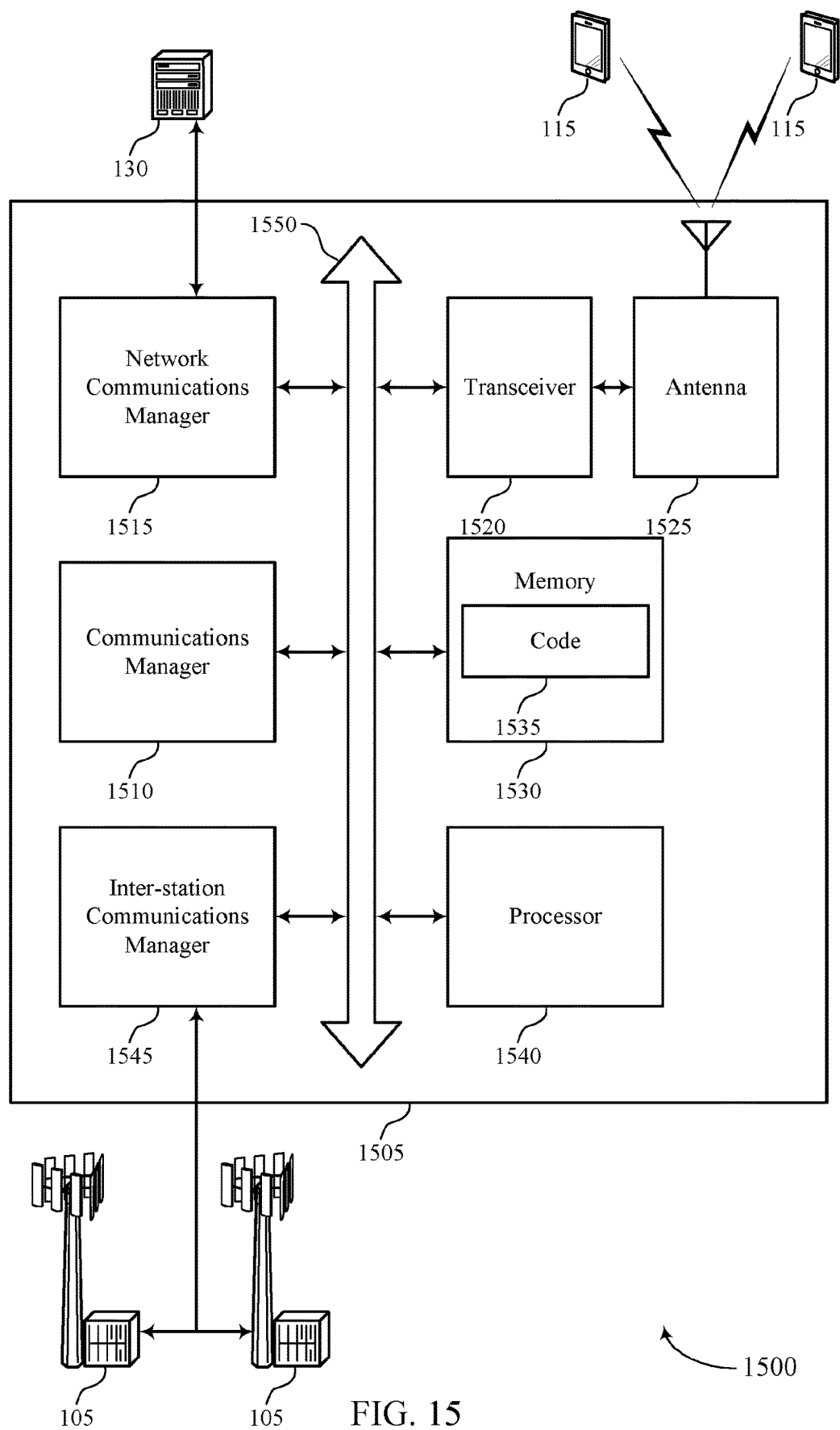
FIG. 15 shows a diagram of a system including a device that supports scheduling for feedback response in accordance with aspects of the present disclosure.

FIG. 15 shows a diagram of a system 1500 including a device 1505 that supports scheduling instance scheduling for feedback response in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may transmit at least one control message within a set of downlink subframes in a current scheduling instance, transmit a set of data messages within the set of downlink subframes in the current scheduling instance, where a first subset of the set of data messages is transmitted in accordance with the at least one control message in the current scheduling instance, and where a second subset of the set of data messages is transmitted in accordance with one or more control messages transmitted in a previous scheduling instance, where a feedback timing for the first subset of the set of data messages is based on the at least one control message, and where the feedback timing for the second subset of the set of data messages is based on the one or more control messages transmitted in the previous scheduling instance, and receive one or more bundled feedback responses during uplink subframes in the current scheduling instance and in accordance with the feedback timing for each of the set of data messages.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting scheduling instance scheduling for feedback response).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
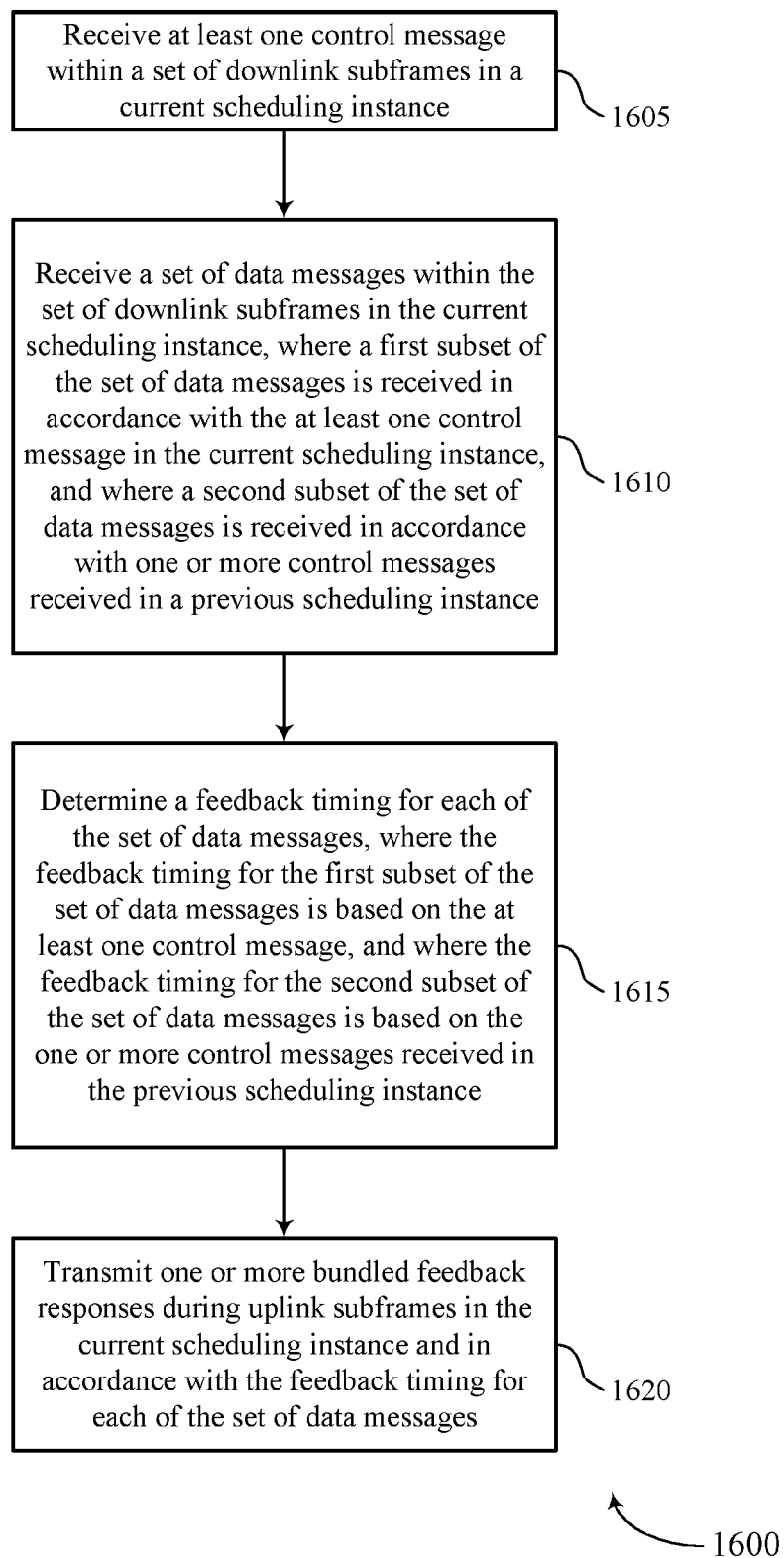
FIGS. 16 through 18 show flowcharts illustrating methods that support scheduling for feedback response in accordance with aspects of the present disclosure.

FIG. 16 shows a flowchart illustrating a method 1600 that supports scheduling instance scheduling for feedback response in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may receive at least one control message within a set of downlink subframes in a current scheduling instance. The operations of 1605 may be performed according to the methods described herein. In some examples, aspects of the operations of 1605 may be performed by a control message interface as described with reference to FIGS. 8 through 11.

At 1610, the UE may receive a set of data messages within the set of downlink subframes in the current scheduling instance, where a first subset of the set of data messages is received in accordance with the at least one control message in the current scheduling instance, and where a second subset of the set of data messages is received in accordance with one or more control messages received in a previous scheduling instance. The operations of 1610 may be performed according to the methods described herein. In some examples, aspects of the operations of 1610 may be performed by a data message interface as described with reference to FIGS. 8 through 11.

At 1615, the UE may determine a feedback timing for each of the set of data messages, where the feedback timing for the first subset of the set of data messages is based on the at least one control message, and where the feedback timing for the second subset of the set of data messages is based on the one or more control messages received in the previous scheduling instance. The operations of 1615 may be performed according to the methods described herein. In some examples, aspects of the operations of 1615 may be performed by a feedback timing component as described with reference to FIGS. 8 through 11.

At 1620, the UE may transmit one or more bundled feedback responses during uplink subframes in the current scheduling instance and in accordance with the feedback timing for each of the set of data messages. The operations of 1620 may be performed according to the methods described herein. In some examples, aspects of the operations of 1620 may be performed by a feedback response component as described with reference to FIGS. 8 through 11.

Figure 17:
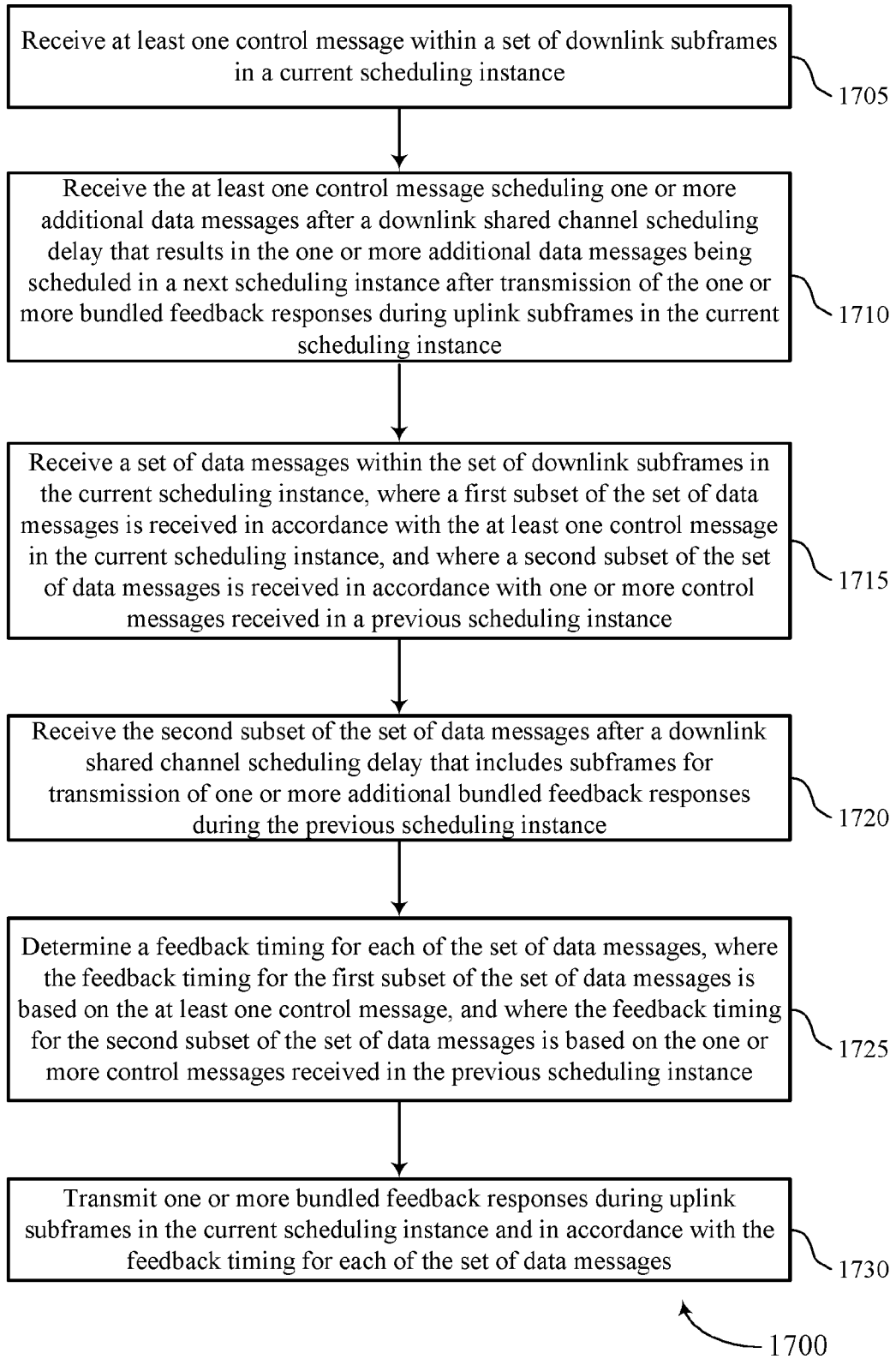

FIG. 17 shows a flowchart illustrating a method 1700 that supports scheduling instance scheduling for feedback response in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1705, the UE may receive at least one control message within a set of downlink subframes in a current scheduling instance. The operations of 1705 may be performed according to the methods described herein. In some examples, aspects of the operations of 1705 may be performed by a control message interface as described with reference to FIGS. 8 through 11.

At 1710, the UE may receive the at least one control message scheduling one or more additional data messages after a downlink shared channel scheduling delay that results in the one or more additional data messages being scheduled in a next scheduling instance after transmission of the one or more bundled feedback responses during uplink subframes in the current scheduling instance. The operations of 1710 may be performed according to the methods described herein. In some examples, aspects of the operations of 1710 may be performed by a control message interface as described with reference to FIGS. 8 through 11.

At 1715, the UE may receive a set of data messages within the set of downlink subframes in the current scheduling instance, where a first subset of the set of data messages is received in accordance with the at least one control message in the current scheduling instance, and where a second subset of the set of data messages is received in accordance with one or more control messages received in a previous scheduling instance. The operations of 1715 may be performed according to the methods described herein. In some examples, aspects of the operations of 1715 may be performed by a data message interface as described with reference to FIGS. 8 through 11.

At 1720, the UE may receive the second subset of the set of data messages after a downlink shared channel scheduling delay that includes subframes for transmission of one or more additional bundled feedback responses during the previous scheduling instance. The operations of 1720 may be performed according to the methods described herein. In some examples, aspects of the operations of 1720 may be performed by a data message interface as described with reference to FIGS. 8 through 11.

At 1725, the UE may determine a feedback timing for each of the set of data messages, where the feedback timing for the first subset of the set of data messages is based on the at least one control message, and where the feedback timing for the second subset of the set of data messages is based on the one or more control messages received in the previous scheduling instance. The operations of 1725 may be performed according to the methods described herein. In some examples, aspects of the operations of 1725 may be per-formed by a feedback timing component as described with reference to FIGS. 8 through 11.

At 1730, the UE may transmit one or more bundled feedback responses during uplink subframes in the current scheduling instance and in accordance with the feedback timing for each of the set of data messages. The operations of 1730 may be performed according to the methods described herein. In some examples, aspects of the operations of 1730 may be performed by a feedback response component as described with reference to FIGS. 8 through 11.

Figure 18:
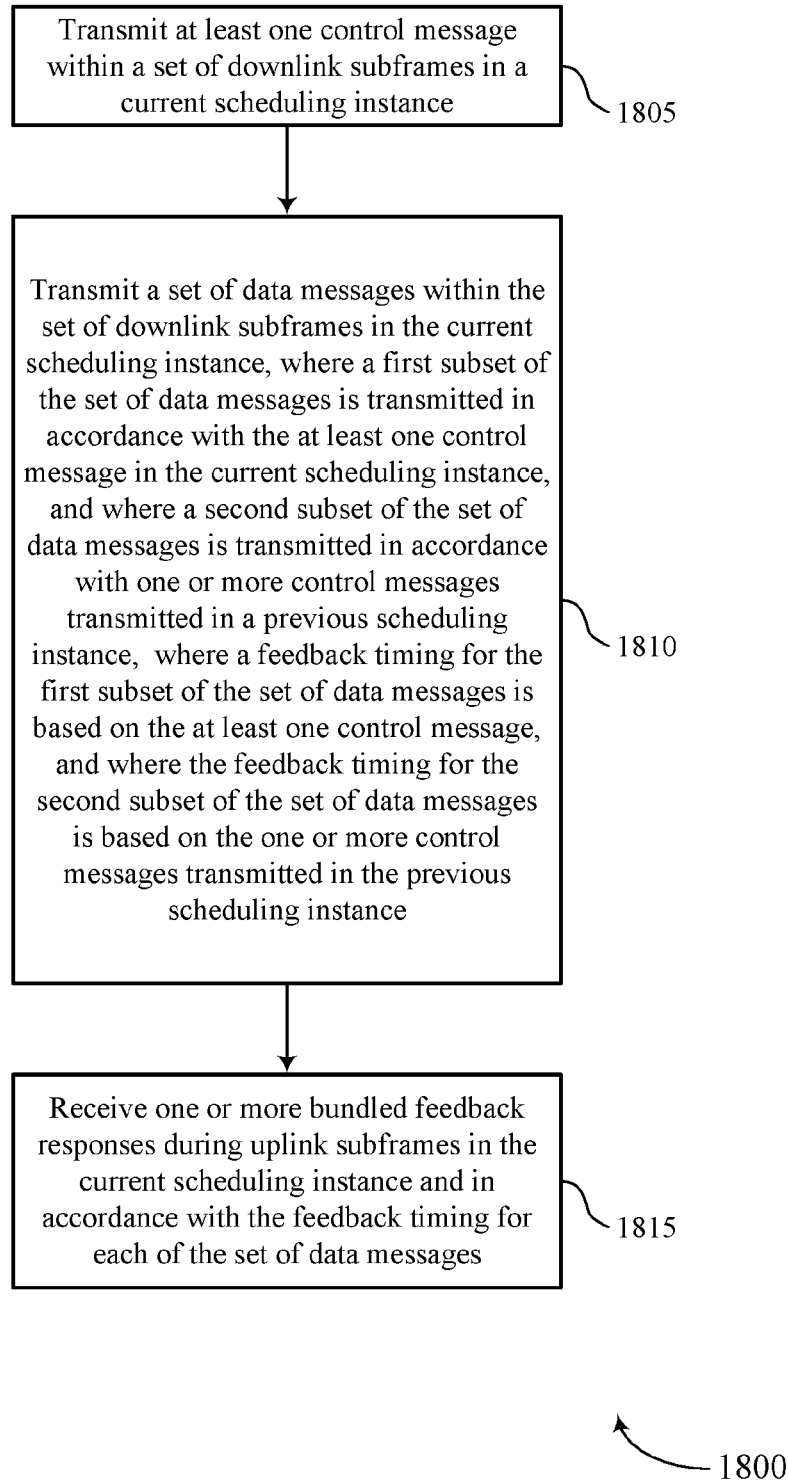

FIG. 18 shows a flowchart illustrating a method 1800 that supports scheduling instance scheduling for feedback response in accordance with aspects of the present disclosure. The operations of method 1800 may be implemented by a base station 105 or its components as described herein. For example, the operations of method 1800 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1805, the base station may transmit at least one control message within a set of downlink subframes in a current scheduling instance. The operations of 1805 may be performed according to the methods described herein. In some examples, aspects of the operations of 1805 may be performed by a control message interface as described with reference to FIGS. 12 through 15.

At 1810, the base station may transmit a set of data messages within the set of downlink subframes in the current scheduling instance, where a first subset of the set of data messages is transmitted in accordance with the at least one control message in the current scheduling instance, and where a second subset of the set of data messages is transmitted in accordance with one or more control messages transmitted in a previous scheduling instance, where a feedback timing for the first subset of the set of data messages is based on the at least one control message, and where the feedback timing for the second subset of the set of data messages is based on the one or more control messages transmitted in the previous scheduling instance. The operations of 1810 may be performed according to the methods described herein. In some examples, aspects of the operations of 1810 may be performed by a data message interface as described with reference to FIGS. 12 through 15.

At 1815, the base station may receive one or more bundled feedback responses during uplink subframes in the current scheduling instance and in accordance with the feedback timing for each of the set of data messages. The operations of 1815 may be performed according to the methods described herein. In some examples, aspects of the operations of 1815 may be performed by a feedback response component as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar scheduling instance timing, and transmissions from different base stations may be approximately aligned in time. For asynchronous operation, the base stations may have different scheduling instance timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving at least one control message within a set of downlink subframes in a current scheduling instance;
   receiving a plurality of data messages within the set of downlink subframes in the current scheduling instance, wherein a first subset of the plurality of data messages is received in accordance with the at least one control message in the current scheduling instance, and wherein a second subset of the plurality of data messages is received in accordance with one or more control messages received in a previous scheduling instance;
   determining a feedback timing for each of the plurality of data messages, wherein the feedback timing for the first subset of the plurality of data messages is based on the at least one control message, and wherein the feedback timing for the second subset of the plurality of data messages is based on the one or more control messages received in the previous scheduling instance; and
   transmitting one or more bundled feedback responses during uplink subframes in the current scheduling instance and in accordance with the feedback timing for each of the plurality of data messages.

2. The method of claim 1, wherein receiving the plurality of data messages comprises:
   receiving the second subset of the plurality of data messages after a downlink shared channel scheduling delay that includes subframes for transmission of one or more additional bundled feedback responses during the previous scheduling instance.

3. The method of claim 1, wherein receiving the at least one control message comprises:
   receiving the at least one control message scheduling one or more additional data messages after a downlink shared channel scheduling delay that results in the one or more additional data messages being scheduled in a next scheduling instance after transmission of the one or more bundled feedback responses during uplink subframes in the current scheduling instance.

4. The method of claim 1, further comprising:
   processing concurrent hybrid automatic repeat request (HARQ) processes associated with the at least one control message received within the set of downlink subframes of the current scheduling instance and with the one or more control messages received in the previous scheduling instance.

5. An apparatus for wireless communications at a user equipment (UE), comprising:
   one or more processors,
   memory coupled with the one or more processors; and
   instructions stored in the memory and executable by the one or more processors to cause the apparatus to:
   receive at least one control message within a set of downlink subframes in a current scheduling instance;
   receive a plurality of data messages within the set of downlink subframes in the current scheduling instance, wherein a first subset of the plurality of data messages is received in accordance with the at least one control message in the current scheduling instance, and wherein a second subset of the plurality of data messages is received in accordance with one or more control messages received in a previous scheduling instance;
   determine a feedback timing for each of the plurality of data messages, wherein the feedback timing for the first subset of the plurality of data messages is based on the at least one control message, and wherein the feedback timing for the second subset of the plurality of data messages is based on the one or more control messages received in the previous scheduling instance; and
   transmit one or more bundled feedback responses during uplink subframes in the current scheduling instance and in accordance with the feedback timing for each of the plurality of data messages.

6. The apparatus of claim 5, wherein the instructions to receive the plurality of data messages are executable by the one or more processors to cause the apparatus to:
receive the second subset of the plurality of data messages after a downlink shared channel scheduling delay that includes subframes for transmission of one or more additional bundled feedback responses during the previous scheduling instance.

7. The apparatus of claim 5, wherein the instructions to receive the at least one control message are executable by the one or more processors to cause the apparatus to:
receive the at least one control message scheduling one or more additional data messages after a downlink shared channel scheduling delay that results in the one or more additional data messages being scheduled in a next scheduling instance after transmission of the one or more bundled feedback responses during uplink subframes in the current scheduling instance.

8. The apparatus of claim 5, wherein the instructions are further executable by the one or more processors to cause the apparatus to:
process concurrent hybrid automatic repeat request (HARQ) processes associated with the at least one control message received within the set of downlink subframes of the current scheduling instance and with the one or more control messages received in the previous scheduling instance.

9. The apparatus of claim 5, wherein the instructions are further executable by the one or more processors to cause the apparatus to:
identify a hybrid automatic repeat request (HARQ) identifier (ID) field in a first control message of the at least one control message; and
compare a value of the HARQ ID field included in the first control message with a HARQ ID field threshold.

10. The apparatus of claim 9, wherein the instructions are further executable by the one or more processors to cause the apparatus to:
determine that the value of the HARQ ID field in the first control message is greater than the HARQ ID field threshold; and
determine a downlink shared channel scheduling delay associated with the first control message based on a HARQ acknowledgement (ACK) delay field in the first control message.

11. The apparatus of claim 9, wherein the instructions are further executable by the one or more processors to cause the apparatus to:
determine that the value of the HARQ ID field in the first control message is greater than the HARQ ID field threshold; and
determine a HARQ process ID associated with the first control message based on a HARQ acknowledgement (ACK) delay field in the first control message.

12. The apparatus of claim 9, wherein the instructions are further executable by the one or more processors to cause the apparatus to:
determine that the value of the HARQ ID field in the first control message is greater than the HARQ ID field threshold; and
determine a feedback delay associated with the first control message based on the HARQ ID field.

13. The apparatus of claim 9, wherein the instructions are further executable by the one or more processors to cause the apparatus to:
determine, based on the value of the HARQ ID field being less than or equal to the HARQ ID field threshold, a downlink shared channel scheduling delay associated with the first control message, a HARQ process ID associated with the first control message, and a feedback delay associated with the first control message, wherein the downlink shared channel scheduling delay is a smaller of two available downlink shared channel scheduling delay values, the HARQ process ID is equal to the value of the HARQ ID field, and the feedback delay is indicated by a HARQ acknowledgement (ACK) delay field in the first control message.

14. The apparatus of claim 13, wherein the two available downlink channel scheduling delay values comprise two downlink subframes and seven downlink subframes, where the determined downlink shared channel scheduling delay is two downlink subframes based on the value of the HARQ ID field being less than or equal to the HARQ ID field threshold.

15. The apparatus of claim 5, wherein the instructions are further executable by the one or more processors to cause the apparatus to:
identify an enhanced scheduling field in a first control message of the at least one control message; and
determine, based on a value of the enhanced scheduling field, a downlink shared channel scheduling delay associated with the first control message, a hybrid automatic repeat request (HARQ) process identifier (ID) associated with the first control message, and a feedback delay associated with the first control message.

16. The apparatus of claim 5, wherein the instructions are further executable by the one or more processors to cause the apparatus to:
identify a hybrid automatic repeat request (HARQ) process identifier (ID) associated with each of the one or more control messages received in the previous scheduling instance; and
identify the HARQ process ID associated with the at least one control message of the current scheduling instance, wherein the HARQ process ID associated with the one or more control messages received in the previous scheduling instance are different from the HARQ process ID associated with the at least one control message of the current scheduling instance.

17. The apparatus of claim 5, wherein the instructions to receive the plurality of data messages within the set of downlink subframes in the current scheduling instance are executable by the one or more processors to cause the apparatus to:
receive more than ten data messages within the set of downlink subframes in the current scheduling instance.

18. The apparatus of claim 5, wherein the instructions to receive the plurality of data messages are executable by the one or more processors to cause the apparatus to:
receive the second subset of the plurality of data messages after a downlink shared channel scheduling delay of seven subframes.

19. The apparatus of claim 5, wherein the instructions to determine the feedback timing for each of the plurality of data messages are executable by the one or more processors to cause the apparatus to:
determine a feedback delay for one of the plurality of data messages of twelve or thirteen subframes.

20. The apparatus of claim 5, wherein receiving the plurality of data messages comprise receiving each of the plurality of data messages in a respective downlink subframe of at least eleven downlink subframes comprising the set of downlink subframes.

21. The apparatus of claim 5, wherein the instructions to receive the at least one control message are executable by the one or more processors to cause the apparatus to:
    receive a first control message of the at least one control message, the first control message scheduling multiple data messages.

22. The apparatus of claim 21, wherein the instructions are further executable by the one or more processors to cause the apparatus to:
    determine that the multiple data messages scheduled by the first control message exceeds a threshold number of data messages; and
    identify a scheduling gap between a first portion of the multiple data messages that is less than or equal to the threshold number and a second portion of the multiple data messages that exceeds the threshold number, wherein the scheduling gap facilitates receipt of the second portion of the multiple data messages in a next scheduling instance that follows the current scheduling instance.

23. The apparatus of claim 22, wherein the threshold number of data messages is ten.

24. The apparatus of claim 5, wherein the instructions to receive the plurality of data messages are further executable by the one or more processors to cause the apparatus to:
    receive the plurality of data messages within the set of downlink subframes in the current scheduling instance, wherein each downlink subframe of the set of downlink subframes includes a data message of the plurality of data messages.

25. The apparatus of claim 5, wherein the current scheduling instance is scheduled for an enhanced machine type communication (eMTC).

26. The apparatus of claim 5, wherein the instructions are further executable by the one or more processors to cause the apparatus to:
    identify a plurality of hybrid automatic repeat request (HARQ) process identifiers (IDs) corresponding to the plurality of data messages, wherein the plurality of HARQ process IDs comprises at least twelve HARQ process IDs.

27. The apparatus of claim 26, wherein the instructions are further executable by the one or more processors to cause the apparatus to:
    overbook a subset of the plurality of HARQ process identifiers.

28. The apparatus of claim 26, wherein the instructions are further executable by the one or more processors to cause the apparatus to:
    store each of the plurality of HARQ process identifiers.

29. An apparatus for wireless communications at a user equipment (UE), comprising:
    means for receiving at least one control message within a set of downlink subframes in a current scheduling instance;
    means for receiving a plurality of data messages within the set of downlink subframes in the current scheduling instance, wherein a first subset of the plurality of data messages is received in accordance with the at least one control message in the current scheduling instance, and wherein a second subset of the plurality of data messages is received in accordance with one or more control messages received in a previous scheduling instance;
    means for determining a feedback timing for each of the plurality of data messages, wherein the feedback timing for the first subset of the plurality of data messages is based on the at least one control message, and wherein the feedback timing for the second subset of the plurality of data messages is based on the one or more control messages received in the previous scheduling instance; and
    means for transmitting one or more bundled feedback responses during uplink subframes in the current scheduling instance and in accordance with the feedback timing for each of the plurality of data messages.

30. A non-transitory computer-readable medium storing code for wireless communications at a user equipment (UE), the code comprising instructions executable by one or more processors to:
    receive at least one control message within a set of downlink subframes in a current scheduling instance;
    receive a plurality of data messages within the set of downlink subframes in the current scheduling instance, wherein a first subset of the plurality of data messages is received in accordance with the at least one control message in the current scheduling instance, and wherein a second subset of the plurality of data messages is received in accordance with one or more control messages received in a previous scheduling instance;
    determine a feedback timing for each of the plurality of data messages, wherein the feedback timing for the first subset of the plurality of data messages is based on the at least one control message, and wherein the feedback timing for the second subset of the plurality of data messages is based on the one or more control messages received in the previous scheduling instance; and
    transmit one or more bundled feedback responses during uplink subframes in the current scheduling instance and in accordance with the feedback timing for each of the plurality of data messages.

\* \* \* \* \*